United States Patent
Baugh et al.

(10) Patent No.: US 9,006,343 B2
(45) Date of Patent: Apr. 14, 2015

(54) BLENDS OF CO-PRECIPITATED HYDROGENATED ETHYLENE-DICYCLOPENTADIENE AND ELASTOMERIC POLYMERS TO PROVIDE IMPACT MODIFIED STRUCTURAL POLYOLEFINS

(71) Applicant: ExxonMobil Chemical Patents Inc., Baytown, TX (US)

(72) Inventors: Lisa S. Baugh, Ringoes, NJ (US); Enock Berluche, Phillipsburg, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 133 days.

(21) Appl. No.: 13/946,185

(22) Filed: Jul. 19, 2013

(65) Prior Publication Data
US 2013/0310523 A1 Nov. 21, 2013

Related U.S. Application Data

(62) Division of application No. 11/809,573, filed on Jun. 1, 2007, now Pat. No. 8,519,056.

(51) Int. Cl.
*C08L 45/00* (2006.01)
*C08F 236/20* (2006.01)
*C08F 8/04* (2006.01)
*C08L 23/08* (2006.01)
*C08L 23/16* (2006.01)
*C08L 23/26* (2006.01)

(52) U.S. Cl.
CPC .............. *C08F 236/20* (2013.01); *C08F 8/04* (2013.01); *C08L 23/0823* (2013.01); *C08L 23/16* (2013.01); *C08L 23/26* (2013.01); *C08L 2205/02* (2013.01)

(58) Field of Classification Search
CPC ...................................................... C08F 236/20
USPC ................................................. 525/210, 211
See application file for complete search history.

(56) References Cited

U.S. PATENT DOCUMENTS

| | | |
|---|---|---|
| 2,799,668 A | 7/1957 | Anderson et al. |
| 2,883,372 A | 4/1959 | Stamatoff |
| 3,494,897 A | 2/1970 | Reding et al. |
| 3,932,308 A | 1/1976 | Loveless et al. |
| 4,460,724 A | 7/1984 | Tsuchiya et al. |
| 4,614,778 A | 9/1986 | Kajiura et al. |
| 4,874,808 A | 10/1989 | Minami et al. |
| 4,918,133 A | 4/1990 | Moriya et al. |
| 4,992,511 A | 2/1991 | Yamamoto et al. |
| 5,087,677 A | 2/1992 | Brekner et al. |
| 5,218,049 A | 6/1993 | Yamamoto et al. |
| 5,359,001 A | 10/1994 | Epple et al. |
| 5,428,098 A | 6/1995 | Brekner et al. |
| 5,573,717 A | 11/1996 | Peiffer et al. |
| 5,574,100 A | 11/1996 | Sagane et al. |
| 5,753,755 A | 5/1998 | Shachi et al. |
| 5,854,349 A | 12/1998 | Abe et al. |
| 5,863,986 A | 1/1999 | Herrmann-Schonherr et al. |
| 6,090,888 A | 7/2000 | Khanarian et al. |
| 6,191,243 B1 | 2/2001 | Nitta et al. |
| 6,225,407 B1 | 5/2001 | Jacobs et al. |
| 6,255,396 B1 | 7/2001 | Ding et al. |
| 6,331,593 B1 | 12/2001 | Johoji et al. |
| 6,342,549 B1 | 1/2002 | Hirose et al. |
| 6,346,581 B1 | 2/2002 | Tsungae et al. |
| 6,590,033 B2 | 7/2003 | Ding et al. |
| 6,596,810 B1 | 7/2003 | Hatke et al. |
| 6,649,707 B1 | 11/2003 | Rhodes et al. |
| 6,653,388 B1 | 11/2003 | Barbee et al. |
| 6,696,524 B2 | 2/2004 | Hausmann |
| 6,767,966 B2 | 7/2004 | Berger et al. |
| 6,844,059 B2 | 1/2005 | Bernd et al. |
| 7,015,276 B2 | 3/2006 | Morita et al. |
| 2001/0009950 A1 | 7/2001 | Hashidzume et al. |
| 2003/0096898 A1 | 5/2003 | Bernd et al. |
| 2003/0125464 A1 | 7/2003 | Yabui |
| 2003/0236352 A1 | 12/2003 | Winowiecki |
| 2004/0236024 A1 | 11/2004 | Rivett et al. |

(Continued)

FOREIGN PATENT DOCUMENTS

| | | |
|---|---|---|
| DE | 2731445 | 2/1978 |
| DE | 150751 | 9/1981 |

(Continued)

OTHER PUBLICATIONS

Vistalon 7500 flyer, 2003.
Vistalon 8600 flyer, 2001.
Vistalon 8800 flyer, 1997.
F. Stricker et al., "Rubber-toughened cycloolefin copolymers", Die Angewandte Makromolekulare Chemie, 1998, vol. 256, No. 4503, pp. 101-104.
G. Khanarian, "Rubber Toughened and Optically Transparent Blends of Cyclic Olefin Copolymers", Polymer Engineering and Science, 2000, vol. 40, No. 12, pp. 2590-2601.

*Primary Examiner* — Irina Krylova

(57) ABSTRACT

Disclosed is the preparation of compositions which are blends of certain types of hydrogenated ethylene-dicyclopentadiene (E/DCPD) copolymers in combination with elastomeric polymers. An E/DCPD copolymer and an elastomeric polymer are co-dissolved in a common liquid reaction medium which is then subjected to hydrogenation conditions. These hydrogenation conditions serve to hydrogenate in-situ at least a portion of the residual double bonds of the E/DCPD copolymer component and possibly also eliminate any residual unsaturation which might be present in the elastomeric polymers. This combination of materials which has been hydrogenated in-situ can then be co-precipitated to form a polymer composition which can be molded into polyolefin materials of improved structural, thermal and mechanical properties with desirable impact resistance.

16 Claims, No Drawings

(56) References Cited

U.S. PATENT DOCUMENTS

| | | |
|---|---|---|
| 2005/0014898 A1 | 1/2005 | Kanai |
| 2006/0276571 A1 | 12/2006 | Sharma et al. |
| 2007/0093585 A1 | 4/2007 | Syed et al. |
| 2008/0249235 A1 | 10/2008 | Kaneko et al. |

FOREIGN PATENT DOCUMENTS

| | | |
|---|---|---|
| DE | 203059 | 10/1983 |
| DE | 203061 | 10/1983 |
| DE | 203062 | 10/1983 |
| DE | 205916 | 1/1984 |
| DE | 206783 | 2/1984 |
| DE | 209840 | 5/1984 |
| DE | 214849 | 10/1984 |
| DE | 214850 | 10/1984 |
| DE | 214851 | 10/1984 |
| EP | 566 988 | 10/1993 |
| EP | 597 119 | 5/1994 |
| EP | 608 903 | 8/1994 |
| EP | 647 676 | 4/1995 |
| EP | 0 785 969 | 10/1995 |
| EP | 726 291 | 8/1996 |
| EP | 0 743 341 | 11/1996 |
| EP | 0 964 005 | 12/1999 |
| EP | 1 245 591 | 11/2006 |
| JP | 48-074590 | 10/1973 |
| JP | 63243103 | 10/1988 |
| JP | 01318054 | 12/1989 |
| JP | 03079611 | 4/1991 |
| JP | 03255145 | 11/1991 |
| JP | 04170453 | 6/1992 |
| JP | 04170454 | 6/1992 |
| JP | 05009351 | 1/1993 |
| JP | 52-079489 | 10/1993 |
| JP | 05320267 | 12/1993 |
| JP | 05320268 | 12/1993 |
| JP | 07247386 | 9/1995 |
| JP | 07292181 | 11/1995 |
| JP | 10095881 | 4/1998 |
| JP | 2003/02811 | 10/2000 |
| JP | 2001-031716 | 2/2001 |
| JP | 2004/156048 | 6/2004 |
| JP | 2004231921 | 8/2004 |
| JP | 2005010813 | 1/2005 |
| WO | WO 98/44043 | 10/1998 |

BLENDS OF CO-PRECIPITATED HYDROGENATED ETHYLENE-DICYCLOPENTADIENE AND ELASTOMERIC POLYMERS TO PROVIDE IMPACT MODIFIED STRUCTURAL POLYOLEFINS

CROSS REFERENCE TO RELATED APPLICATIONS

This application is a Divisional application of U.S. application Ser. No. 11/809,573, filed Jun. 1, 2007, now allowed.

FIELD OF THE INVENTION

Disclosed herein is the preparation of polymer compositions comprising co-precipitated blends of hydrogenated ethylene-dicyclopentadiene copolymers with elastomeric polymer modifiers. Such compositions can be formed into structural polyolefin materials having desirable thermal, structural and impact resistance properties.

BACKGROUND OF THE INVENTION

Alpha-olefins can be copolymerized with rigid cyclic olefins, such as norbornene, 5-ethylidene-2-norbornene and dicyclopentadiene, using various polymerization catalysts. When these copolymers contain more than 30 wt % cyclic olefins, they are typically amorphous and transparent (>90% light transmittance) and have glass transition temperatures ($T_g$s) above room temperature (>50° C.). With higher levels of cyclic olefin incorporation they have exceptionally high moduli (>2900 MPa), heat distortion temperatures (>130° C.@66 psi), and Rockwell hardness (>100). However, they have very poor notched Izod impact properties (<0.5 ft-lb/in@room temperature) and have brittle failures in the instrumented impact test at room temperature and below. (Brittle failures are cracks that propagate without plastic deformation of the polymers.)

Thus, without modification, cyclic olefin copolymers (COCs) have too little impact resistance to be used in most structural applications, such as automotive components. For automotive and other structural applications the ideal materials would have good impact properties and good heat distortion temperatures, while maintaining as high as possible flexural, tensile, and Young's moduli.

To improve their impact resistance, cyclic olefin copolymers are therefore generally blended with various elastomers. A number of blends of these types of materials are known in the art. U.S. Pat. No. 4,918,133, for example, discloses a cycloolefin type random copolymer composition, which is alleged to exhibit excellent heat resistance, chemical resistance, rigidity, and impact resistance, and which is a blend of several types of copolymer materials. The copolymer compositions of the '133 patent comprise (A) a random copolymer containing an ethylene component and a cycloolefin component and having certain intrinsic viscosity characteristics and a softening temperature (TMA) of not lower than 70° C., and (B) one or more non-rigid copolymers. The blends are prepared by solution blending and co-precipitation of the two blend components, by dry-blending, or by melt-mixing.

The cycloolefin component of the copolymer (A) in such compositions of the '133 patent can be any of a large number of 1- to 4-ring bridged cyclic olefins having a single double bond, such as bicyclo[2,2,1]hept-2-ene (norbornene) and tricyclo[4,3,0,1$^{2.5}$]-3-decene, among many others. The non-rigid copolymer (B) can be selected from: (i) a random copolymer containing an ethylene component, at least one other α-olefin component and a cycloolefin component and having certain intrinsic viscosity characteristics and a softening temperature (TMA) of below 70° C., (ii) a non-crystalline to low crystalline α-olefin type elastomeric copolymer formed from at least two α-olefins, (iii) an α-olefin-diene type elastomeric copolymer formed from at least two α-olefins and at least one non-conjugated diene, and/or (iv) an aromatic vinyl type hydrocarbon-conjugated diene copolymer or a hydrogenated product thereof.

Similarly, U.S. Pat. No. 4,992,511 also discloses cycloolefinic random copolymer compositions which are alleged to exhibit excellent heat resistance, heat aging resistance, chemical resistance, weather resistance, solvent resistance, dielectric properties, rigidity, impact strength and moldability, and which comprise blends of several types of copolymer materials. These compositions comprise (A) a similar type of cyclo-olefinic random copolymers as are disclosed in the '133 patent, which copolymers contain an ethylene component and a cyclo-olefinic component (which can be a cyclic diene); (B) at least one flexible polymer having a glass transition temperature ($T_g$) of not more than 0° C.; and (C) an organic peroxide to promote cross-linking of the polymeric components. The blends may be prepared by solution blending and co-precipitation of the two blend components or by melt-mixing.

The flexible polymer component of the '511 compositions can be selected from (a) flexible cyclo-olefinic random copolymers comprising an ethylene component, a cyclo-olefin component which can include cyclic dienes, and an alpha-olefin component having 3 to 20 carbon atoms; (b) amorphous or low-crystalline flexible olefinic copolymers comprising at least two components selected from an ethylene component and alpha-olefin components having 3 to 20 carbon atoms; (c) flexible olefin/nonconjugated diene copolymers comprising a nonconjugated diene component and at least two components selected from an ethylene component and alpha-olefin components having 3 to 20 carbon atoms, and (d) flexible aromatic vinyl copolymers selected from random copolymers and block copolymers each comprising an aromatic vinyl hydrocarbon component and a conjugated diene component, and hydrogenation products of these copolymers. No hydrogenation of the pendant olefin units in the cyclo-olefinic random copolymer or elastomeric copolymer compositions is disclosed as part of the blend preparation process.

European Patent Application No. 0 726 291 A1 discloses cycloolefin resin compositions comprising an ethylene/cycloolefin random copolymer and an aromatic vinyl/conjugated diene block copolymer or hydrogenation product thereof. These compositions may be prepared by solution blending followed by solvent evaporation or co-precipitation of the two blend components, or by melt-kneading. No hydrogenation of the pendant olefin units in the cycloolefinic random copolymer or elastomeric copolymer compositions is disclosed as part of the blend preparation process.

Additional references of interest involving COC/elastomer blends include: EP 0 566 988 B1; EP 0 597 119 B1; EP 0 608 903 B1; EP 0 647 676 B1; U.S. Pat. Nos. 5,087,677; 5,359,001; 5,574,100; 5,753,755; 5,854,349; 5,863,986; 6,090,888; 6,225,407; 6,255,396; 6,342,549; 6,590,033; 6,596,810; 6,696,524; US 2003/0096898; US 2003/0125464; US 2004/0236024; US 2005/0014898; JP 05320267; JP 05320268; JP 07247386; JP 07292181; JP 10095881; JP 03255145; JP 01318054; JP 03079611; JP 04170453; JP 04170454; JP 05009351 and JP 2004/156048.

As illustrated by the preceding discussion of representative prior art, much of the previous work involving cyclic olefin copolymer compositions has focused on copolymers of norbornene and other cyclic olefinic comonomers having a single double bond. Cyclic dienes such as dicyclopentadiene (DCPD) have also been used. DCPD is a cyclic olefin comonomer of particular interest because of its low cost and ready availability. The cyclic olefin DCPD comprises two double bonds. Thus, copolymers of DCPD with ethylene or other α-olefins, which copolymers can include terpolymers of DCPD with ethylene and other α-olefins and/or other cyclic olefin termonomers (herein all collectively encompassed by the term "DCPD-based copolymers"), retain a residual double bond in the cyclic olefin moiety after copolymerization.

The presence of residual unsaturation within DCPD-based copolymers can render such copolymers relatively unstable. For example, residual double bonds in ethylene-dicyclopentadiene (E/DCPD) copolymers make these materials susceptible to crosslinking, oxidation and other unwanted side reactions during processing and use. Similar problems can arise if the elastomer utilized in combination with E/DCPD in such copolymer compositions to modify the impact properties thereof also contains any residual unsaturation due to the nature of the comonomers used therein. Thus, if economically attractive DCPD-based materials are to be used as the basis for structural polyolefin preparation, the residual unsaturation within such copolymers needs to be eliminated or reduced by means of partial or complete hydrogenation or other derivatization of the residual double bonds within such copolymer structures.

One approach to preparing stabilized DCPD-based cyclic olefin copolymers for structural uses involves the use of partially hydrogenated DCPD as a comonomer for copolymerization in place of DCPD itself. In partially hydrogenated DCPD (hereinafter referred to as HDCPD), the DCPD cyclopentenyl olefin (which becomes a pendant sidechain olefin after copolymerization in regular DCPD) is selectively saturated, whereas the DCPD norbornenyl olefin (the copolymerizing unit) is retained. This strategy is undesirable because of the relatively higher cost of HDCPD arising from the additional preparation step, difficulties of selective hydrogenation (e.g., separation of HDCPD from DCPD, fully saturated DCPD, and isomers), and the necessity of repurifying the HDCPD monomer to levels acceptable for metallocene polymerization processes. Thus, it is advantageous to eliminate the residual olefins in DCPD-based cyclic olefin copolymers by copolymerizing DCPD itself with ethylene and/or an alpha-olefin or termonomer, and then subsequently hydrogenating the residual olefins in the product polymer. This also adds an extra (yet less costly) step to the preparation of the cyclic olefin copolymer. It is thus additionally desirable to find ways to minimize the cost and difficulty of this hydrogenation step, such as by combining the hydrogenation step with other process steps used to prepare the final material containing the at least partially hydrogenated DCPD-based cyclic olefin.

Another potential obstacle in preparing structural polyolefin materials based on DCPD-containing copolymers combined with impact resistance-enhancing elastomers involves problems which can arise when these two types of materials are blended. Blending of cyclic olefin-based, e.g., DCPD-based, copolymers with elastomers is commonly achieved by melt-mixing these two polymer types followed by extrusion. However, the high $T_g$s of the DCPD-based cyclic olefin copolymer base materials (up to 160° C.) can require that melt-mixing and extrusion be carried out at high temperatures (>230° C.). Thus to avoid degradation of both the base copolymer and the elastomer used as the impact modifier, it is necessary to minimize both the time and temperature of melt-mixing, yet still provide conditions that ensure good mixing between the base material and the elastomer.

Given the foregoing considerations, there is continuing interest in developing procedures for producing, using economically attractive components, polymer mixtures which can be fashioned into structural polyolefin materials that have a desirable combination of thermal and structural property characteristics, including impact resistance. Such procedures involve those which render the resulting mixture of polymers partially, and or even completely, free of moieties such as unsaturation which can adversely affect the chemical stability of such materials either during their preparation or during their end use. Such preparation procedures also are those which avoid or minimize the need for techniques such as melt-mixing that must be carried out under temperature conditions which can degrade the polymers being processed, and furthermore minimize the complexity and cost associated with polymerization and blending. The advantageous properties of such polymer mixtures can thereby be preserved.

SUMMARY OF THE INVENTION

In one aspect, the present disclosure provides a process for preparing polymeric compositions suitable for molding into structural polyolefin material. Such a process comprises: A) dissolving in a liquid reaction medium a certain type of ethylene-dicyclopentadiene (E/DCPD) copolymer component; B) co-dissolving in the liquid reaction medium a certain type of elastomeric polymer component; C) subjecting the liquid reaction medium containing the polymer components to hydrogenation conditions which are effective to at least partially hydrogenate the residual double bond moieties within the ethylene-dicyclopentadiene copolymer component; and D) co-precipitating the resulting at least partially hydrogenated ethylene-dicyclopentadiene copolymer component and the elastomeric polymer component from the liquid reaction medium as a co-precipitated polymeric composition.

The ethylene-dicyclopentadiene copolymer component dissolved in the liquid reaction medium is one which can have a dicyclopentadiene-derived comonomer content of from 25 mole % to 65 mole % with at least 5% of these dicyclopentadiene-derived comonomers having residual double bond moieties therein. The ethylene-dicyclopentadiene copolymer component can also have a weight average molecular weight, $M_w$, of from 50,000 to 1,000,000 g/mole; and a glass transition temperature, $T_g$, of from 85° C. to 190° C. The elastomeric polymer component co-dissolved in the liquid reaction medium is one which can have a glass transition temperature, $T_g$, that ranges from −80° C. to 0° C.

In another aspect, the present disclosure is directed to polymer compositions suitable for molding into structural polyolefin products. Such compositions comprise a certain type of an at least partially hydrogenated E/DCPD copolymer component (which can include copolymers which are terpolymers and/or which contain functionalized DCPD-derived units) and a certain type of an elastomeric polymer component. In the polymer compositions herein, both of these polymer component types have been co-dissolved in and subsequently co-precipitated from a liquid reaction medium.

The at least partially hydrogenated E/DCPD copolymer component of the compositions herein can have a dicyclopentadiene-derived comonomer content of from 25 mole % to 65 mole % with at least 5% of these dicyclopentadiene-derived comonomers having had residual double bond moieties therein prior to hydrogenation. This at least partially hydrogenated ethylene-dicyclopentadiene copolymer component can also have a weight average molecular weight, $M_w$, of from 50,000 to 1,000,000 g/mole; and a glass transition temperature, $T_g$, of 85° C. to 190° C. The elastomeric polymer component of the compositions herein can have a glass transition temperature, $T_g$, which ranges from −80° C. to 0° C.

The foregoing and other features and attributes of the disclosed process and compositions and processes involving the polymer materials disclosed herein and their advantageous applications and/or uses will be apparent from the detailed description which follows. In this detailed description and in the summary above and in the claims which are provided hereinafter, all numerical values are understood to be modified by the term "about".

DETAILED DESCRIPTION OF THE INVENTION

The polymeric materials which are prepared and used as disclosed herein are either homopolymers or are copolymers comprising at least one α-olefin comonomer (frequently ethylene) and at least one other different type of monoolefinic or diene comonomer (frequently cyclic). For purposes herein, a "copolymer" or "copolymer component" is generically any material which is prepared by co-polymerizing at least two different comonomer types including the generally present specific comonomers described herein.

Polymeric materials which comprise three different types of comonomers, as do some of the polymeric materials of this disclosure, are encompassed by the generic term "copolymer" or "copolymer component" but can also be specifically referred to herein as "terpolymers." Polymers which are prepared from three comonomer types as described herein may for purposes of this disclosure still be referred to as "terpolymers" even though such terpolymers may comprise minor amounts of a fourth or even additional comonomer types. Such materials are also still "terpolymers" for purposes herein even though some comonomers of the same general type may not all be present in the polymer chain in or with the same chemical structural (e.g., substituted norbornenes), microstructural (e.g., tacticity) or stereochemical configuration.

As indicated hereinbefore, two different types of polymer components are used in the process disclosed herein to prepare the polymeric compositions also disclosed herein. These two polymer component types, as well as the preparation process and polymer compositions employing them, are described in detail as follows:

A) Ethylene-Dicyclopentadiene Copolymer Component

One component used in the process herein to form the polymer compositions herein comprises ethylene-dicyclopentadiene copolymers. Such materials are polyolefins made up of monomeric units derived from both ethylene (E) and the diene dicyclopentadiene (DCPD). In forming such E/DCPD copolymers, DCPD is selectively polymerized through enchainment of the norbornene ring in the DCPD structure in very general terms according to the following reaction Scheme 1:

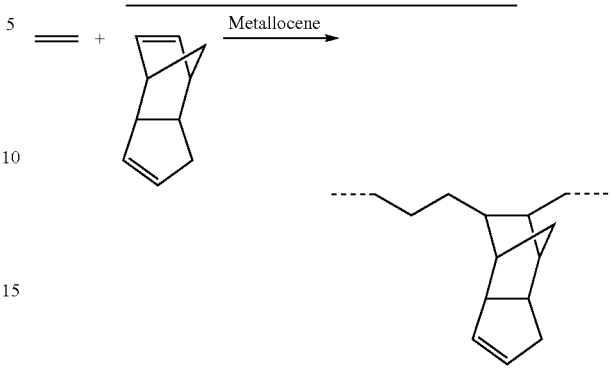

Scheme 1.
Synthesis of copolymer consisting of ethylene and dicyclopentadiene using a metallocene catalyst.

As can be seen from the foregoing reaction scheme, the ethylene-dicyclopentadiene copolymers used herein are addition copolymers and are not ring-opened metathesis polymers (i.e., not ROMP polymers). These copolymer materials are formed by vinyl addition (not ring-opening) polymerization of the cyclic olefinic comonomer.

The two comonomers ethylene and dicyclopentadiene are readily available raw materials. Ethylene is produced in the petrochemical industry via steam cracking or catalytic cracking of hydrocarbons. Ethylene can also be produced via catalytic conversion of oxygenate feedstocks using molecular sieve catalysts. Dicyclopentadiene, $C_{10}H_{12}$, is a hydrocarbon found in oil deposits. It is a clear and colorless liquid at room temperature. Dicyclopentadiene is coproduced in large quantities in the steam cracking of naphtha and gas oils to ethylene.

The ethylene-dicyclopentadiene components used in the process and ultimately, after hydrogenation, in the polymer compositions herein can generally contain from 25 mole % to 65 mole % of the DCPD-derived monomeric units. Or these E/DCPD copolymer components can comprise from 27.5 mole % to 60 mole % of the DCPD-derived units. Alternatively, the DCPD content of the E/DCPD copolymer components used herein can range from 30 mole % to 55 mole %.

The E/DCPD copolymers used herein comprise a polymeric backbone which contains pendant polycyclic moieties in the DCPD-derived comonomer units as shown in the copolymerization reaction Scheme 1 set forth above. These pendant polycyclic moieties contain one residual double bond within the copolymer, and it is such residual double bonds which render the resulting E/DCPD copolymers relatively unstable. For example, unsaturation can render these materials susceptible to cross-linking, unintended oxidation and other unwanted side reactions during processing and use.

The presence of the residual double bonds in the pendant polycyclic moieties, however, also provides the copolymers of the E/DCPD copolymer components herein with a reactive "hook" by and through which they can be readily derivatized, e.g., at least partially hydrogenated in accordance with the process described herein, or partially functionalized prior to the process described herein, as hereinafter described. Hydrogenation results in the pendant polycyclic double bond-containing units of the copolymers within the E/DCPD copolymer components herein being converted into saturated aliphatic polycyclic units. Such at least partially hydrogenated copolymer components are relatively more stable than the unsaturated or less saturated E/DCPD copolymer components, and accordingly have properties which make polymer compositions containing them especially suitable as engineering thermoplastics or precursors thereof.

After copolymerization of the ethylene and DCPD comonomers, the resulting copolymer materials will have residual double bonds present in 100% of the DCPD-derived comonomer units with such E/DCPD copolymers. Instead of being at least partially hydrogenated in accordance with the process disclosed herein, some of these residual double bonds in the DCPD-derived comonomers may instead be functionalized by means of other reactions more fully described hereinafter. If any such functionalization reactions are carried out before the E/DCPD copolymer components are used in the process herein, then less than 100% of the DCPD-derived comonomer units in the E/DCPD copolymer component will contain double bonds which are available for hydrogenation.

In accordance with the process disclosed herein, at least 5% of the DCPD-derived comonomer units within the E/DCPD copolymer component will have residual double bonds therein which are available for hydrogenation. Alternatively, from 7.5% to 100%, or even from 10% to 100%, of the DCPD-derived comonomer units within the E/DCPD copolymer component will have residual double bonds therein which are available for hydrogenation.

One type of functionalization reaction which can be utilized to lower the content of residual double bonds within the E/DCPD copolymer component prior to hydrogenation in accordance with the process herein comprises an oxidation reaction which will epoxidize or hydroxylate the E/DCPD copolymer component. For example, oxidation can be carried out to convert up to 95% of the double bonds of the DCPD-derived monomeric units to oxirane groups and/or to dihydroxyl (diol) groups. Epoxidation and/or hydroxylation can be carried out by contacting the E/DCPD copolymer components herein, in a suitable reaction mixture, with peroxides or peracids, either with or without the use or presence of an oxidation catalyst and under appropriate oxidation reaction conditions for whatever type and extent of oxidation functionalization is desired.

Conventional E/DCPD copolymer oxidation techniques employing, for example, peroxide or peracid oxidizing agents such as hydrogen peroxide, performic acid or perchlorobenzoic acid may be utilized. Such conventional oxidation techniques are disclosed, for instance in Marathe et al. *Macromolecules* 1994, 27, p. 1083; Sarazin et al. *Macromol. Rapid Commun.* 2005, 26, p. 83; Song et al. *J. Polym. Sci., Polym. Chem. Ed.* 2002, 40, p. 1484; Shigenobu et al. Japanese Patent Application Publication No. JP2001/031716A; Suzuki et al. *J. Appl. Polym. Sci.* 1999, 72, p. 103; and Li et al. *Macromolecules* 2005, 38, p. 6767.

Typically, the E/DCPD copolymer components herein can be functionalized, if desired, to convert from 0.1% to 95% of the residual double bonds of the DCPD-derived comonomer units to oxirane and/or diol and/or other oxygen- or nitrogen-containing functional groups prior to, or even after, hydrogenation of some or all of the remaining residual double bonds in accordance with the process herein. Alternatively, 2.5% to 92.5% of the residual double bonds of the DCPD-derived comonomers can be converted to functional groups. Or, 5.0% to 95.0% of the residual double bonds can be converted. In one suitable embodiment, the E/DCPD copolymer component can be epoxidized to the extent of converting from 5.0% to 90.0% of the residual double bonds therein to oxirane moieties before this copolymer component is hydrogenated.

Whether or not the E/DCPD copolymer components used in the process and compositions herein have been functionalized, the E/DCPD copolymer component, either before or after hydrogenation, can generally have a weight average molecular weight, $M_w$, of from 50,000 to 1,000,000 g/mole as measured versus polystyrene standards by Gel Permeation Chromatography analysis. Alternatively, the E/DCPD copolymer components herein can have an $M_w$ of from 75,000 to 900,000 g/mole, or even from 100,000 to 800,000 g/mole. As noted, weight average molecular weight for these E/DCPD copolymer materials can be determined in standard fashion using Gel Permeation Chromatography such as is described in the Test Methods section hereinafter.

The E/DCPD copolymer components used in the process and compositions herein will optimally comprise highly amorphous materials. As used herein, an amorphous polymer is defined to be a polymeric material having substantially no crystalline component, as evidenced by no discernible melting temperature ($T_m$) in its second heat Differential Scanning Calorimetry (DSC) spectrum, or a polymeric material having a crystalline component that exhibits a second heat DSC $T_m$ with a heat of fusion ($\Delta H_f$) of less than 0.50 J/g.

The E/DCPD copolymer components useful herein which are highly amorphous will generally have no or only very small amounts of long, crystallizable polyethylene segments in the copolymer chains within such components. Furthermore, such highly amorphous materials will likewise contain no significant amounts of polyethylene homopolymers admixed with the copolymers.

The presence or absence of both types of polyethylene-containing materials can be determined, as noted hereinbefore, by using standard Differential Scanning Calorimetry (DSC) techniques (as described hereinafter in the Test Methods section) in testing the various copolymer materials useful herein for their thermal transition temperatures. For purposes of this disclosure, the absence of significant amounts of long, crystallizable polyethylene polymer segments and polyethylene homopolymers is determined to be when the copolymer compositions exhibit no detectable crystalline melting point ($T_m$) during the second heat of DSC analysis testing, or have a crystalline component that exhibits a second heat DSC $T_m$ with a heat of fusion ($\Delta H_f$) of less than 0.50 J/g. The presence or absence of these undesirable, and hence often excluded, polyethylene-based moieties can also be determined by standard Crystallization Analysis Fractionation (CRYSTAF) testing. Advantageously, CRYSTAF testing of the E/DCPD components useful herein will demonstrate solubility readings of at least 90%, or at least 92%, or even at least 94%, after completion of CRYSTAF measurements.

The E/DCPD copolymer components used herein are materials which will exhibit certain glass transition temperature ($T_g$) characteristics. A simplistic view of the glass transition temperature of a polymeric material is the temperature below which molecules therein have very little mobility. On a larger scale, polymers are rigid and brittle below their glass transition temperature and can undergo plastic deformation above it. $T_g$ is usually applicable to amorphous phases such as certain of the E/DCPD copolymer components described herein.

The glass transition temperature of the various types of polymer components useful in the process and polymer compositions herein can be measured via a variety of techniques as discussed in *Introduction to Polymer Science and Technology: An SPE Textbook*, by H. S. Kaufman and J. Falcetta, John Wiley & Sons, 1977, and in *Polymer Handbook*, $3^{rd}$ ed., J. Brandup and E. H. Immergut, Eds., John Wiley & Sons, 1989. The DSC techniques utilized in connection with the present disclosure are well known in the art and, as noted, are described hereinafter in the Test Methods section.

The E/DCPD copolymer components used herein, either before or after hydrogenation, can generally exhibit a glass transition temperature, $T_g$, of from 85° C. to 190° C. At such $T_g$ values, these materials can suitably be used as or in engineering thermoplastic products. Alternatively, the $T_g$ of the E/DCPD copolymer components useful herein can range from 95° C. to 180° C., or even from 105° C. to 170° C.

The introduction of cyclic olefins, and in particular, fused ring cyclic olefins, into polymers with a saturated polyolefin backbone tends to increase the glass transition temperature, $T_g$, of the polymer. These changes arise from the introduction of catenated chains of the carbon atoms pendant on the saturated polyolefin backbone. Thus in general, E/DCPD copolymer components which contain larger amounts of DCPD-derived comonomers will have higher $T_g$s. Such E/DCPD copolymer materials will also, of course, contain higher amounts of residual unsaturation which the higher amounts of DCPD-derived comonomers introduce.

One way of altering, e.g., raising, the $T_g$ of the E/DCPD copolymer components useful herein without introducing additional unsaturation involves incorporation of cyclic comonomers into the copolymers which do not produce any residual double bonds within the copolymer structure, but yet also act to increase $T_g$. One such type of cyclic comonomer comprises cyclic mono-olefins such as norbornene and its derivatives. Thus in one embodiment, the E/DCPD copolymer components herein can comprise terpolymer materials which include, for example, norbornene-based comonomers in addition to those derived from ethylene and DCPD.

Norbornene, $C_7H_{10}$, like DCPD, is a bridged cyclic hydrocarbon. Its molecule consists of a cyclohexene ring which is bridged with a methylene group in the para position. Norborne can be made by a Diels-Alder reaction of cyclopentadiene and ethylene.

Norbornene (NB) will generally have its olefinic double bond in the cyclohexene ring between two carbon atoms which are not associated with the methylene bridge. Accordingly, this material is generally referred to as 2-norbornene to indicate this double bond positioning.

The 2-norbornene molecule may also be substituted at various positions around the cyclohexene ring. Typical substituted norbornenes include 5-methyl-2-norbornene, 5-ethyl-2-norbornene, 5-propyl-2-norbornene, 7-methyl-2-norbornene, 5-isobutyl-2-norbornene, 5,6-dimethyl-2-norbornene, and 5,5,6-trimethyl-2-norbornene. Substituted norbornenes such as these may also be used to form the norbornene-derived comonomers which can be used in terpolymer embodiments of the E/DCPD copolymer components useful herein. For purposes of this disclosure, the term "norbornene" and the designation "NB" encompass 2-norbornene itself as well as substituted derivatives thereof.

In the embodiments of the process and polymer compositions herein wherein the E/DCPD copolymer components comprise terpolymers containing norbornene, such E/DCPD copolymer components can generally contain from 0.5 mole % to 64.5 mole % of the NB-derived monomeric units. Alternatively, these terpolymer-containing E/DCPD copolymer components can comprise from 1.0 mole % to 64.0 mole % of the NB-derived comonomer units. Or, they can comprise from 1.5 mole % to 63.5 mole % of the NB-derived units.

The E/DCPD copolymer components herein can be produced via a polymerization reaction which takes place by contacting ethylene with a polymerization mixture containing DCPD and any optional comonomers. The polymerization reaction is generally promoted by a selected catalyst or catalyst system and can take place under a selected set of polymerization reaction conditions.

Frequently, a diluent or solvent can make up the balance of the polymerization mixture after the comonomers and the catalyst or catalyst systems have been added. Aliphatic and aromatic hydrocarbons such as hexane, pentane, isopentane, cyclohexane, octane, toluene, xylene, and the like may be suitably used as a diluent or solvent for the polymerization mixture. The polymerization mixture can generally be in liquid or mixed liquid/solid form during the polymerization reaction carried out therein.

Any conventional type of polymerization process may be used to produce the E/DCPD copolymer components herein. Polymerization methods include high pressure, slurry, bulk, suspension, supercritical, or solution phase, or a combination thereof. Desirably, solution phase or bulk phase polymerization processes can be used.

Polymerization can generally be carried out using a single-site metallocene catalyst or catalyst system, advantageously of the type hereinafter described. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous is meant a system that operates (or is intended to operate) without interruption or cessation. For example a continuous process to produce a polymer would be one where the reactants are continually introduced into one or more reactors and polymer product is continually withdrawn.

A wide variety of transition metal compounds, e.g., metallocenes, are known which, when activated with a suitable activator, will polymerize olefinic monomers selectively to produce either crystalline copolymers or, for use in the process and compositions herein, amorphous copolymers. Typical metallocene compounds, for example, are described in PCT Patent Application No. WO 2004/046214, published Jun. 3, 2004, the entire contents of which are incorporated herein by reference.

The catalysts advantageously used in the production of the E/DCPD copolymer components of this disclosure include bridged metallocene materials which, upon activation, can selectively polymerize the specified types of comonomers herein to produce generally amorphous copolymers having the desired DCPD and optional comonomer contents, $T_g$ values, and molecular weights. One such suitable type of metallocene catalysts comprises those which are bridged, substituted or unsubstituted, cyclopentadienyl-fluorenyl (Cp-fluorenyl) transition metal compounds.

With respect to apparatus employed in carrying out the polymerization to produce the E/DCPD copolymer components useful herein, the polymerization process can be carried out in a continuous stirred tank reactor, batch reactor or a plug flow reactor, or more than one reactor operated in series or parallel. These reactors may have, or may not have internal cooling or heating, and the monomer feed may or may not be heated or refrigerated.

The E/DCPD copolymer materials formed within the polymerization mixture may be recovered therefrom by any suitable conventional separation means to thereby realize the E/DCPD copolymer components herein. For example, the formed copolymer materials can be precipitated from the polymerization reaction mixture using a suitable agent such as methanol and thereafter recovered via filtration. The recovered material can then be further washed, re-precipitated, re-filtered and dried to provide the desired copolymer component in a form which is usable in the process herein.

B) Elastomeric Polymer Component

A second component used in the process herein to form the polymeric compositions herein is a component comprising elastomeric polymer materials. Such materials are frequently amorphous polyolefins or polydienes made up of monomeric units which can be derived from a wide variety of sources. These elastomeric materials serve to impart favorable impact resistance properties to the polymeric compositions in which they are included.

The elastomeric (or in alternate terminology "flexible") polymers used in the process and polymer compositions herein can desirably have a glass transition temperature, $T_g$, of from −80° C. to 0° C. Alternatively, the $T_g$ of the elastomeric polymer components used herein can range from −75° C. to −2.5° C., or even from −70° C. to −5.0° C. The elastomeric polymer materials used herein are, in fact, defined as "flexible" or "elastomeric" for purposes of the present disclosure if they exhibit glass transition temperature ($T_g$) values falling within the ranges specified hereinbefore for these materials.

The elastomeric polymer materials used as components in the process and polymer compositions herein can be fashioned form a wide variety of olefinic monomers. They can, for example, be comprised of monomeric units derived from α-olefins; other linear or non-linear, acyclic, aliphatic or aromatic mono-olefins; cyclic or polycyclic mono-olefins; conjugated or non-conjugated, linear or non-linear, acyclic, cyclic or polycyclic dienes; or combinations of these monomer types. These elastomeric materials can be homopolymers or random or block copolymers and may also be grafted onto other types of organic moieties. A number of elastomeric polymer materials of the type which are useful herein are described in greater detail in U.S. Pat. No. 4,918,133 which is incorporated herein by reference.

One class of useful elastomeric polymers which can be utilized herein is represented by flexible cycloolefinic random copolymers comprising an ethylene component, a cycloolefin component and an α-olefin component having 3 to 20 carbon atoms. The ethylene-derived units in such random copolymers can comprise from 40 mole % to 99 mole % of the copolymer.

The cycloolefins used to form such copolymers can, for example, be selected from bicyclo[2,2,1]hept-2-ene; 5,10-dimethyltetracyclor[4,4,0,1$^{2.5}$,1$^{7.10}$]-3-dodecene; hexacyclo[6,6,1,1$^{3.6}$,1$^{10.13}$0$^{2.7}$0$^{9.14}$]-4-heptadecene; pentacyclo[6,5,1,1$^{3.6}$,0$^{2.7}$,0$^{9.13}$]-4-pentadecene; pentacyclo[6,5,1,1$^{3.6}$,0$^{2.7}$,0$^{9.13}$]-4-hexadecene; tricyclo[4,3,0,1$^{2.5}$]-3-decene; and substituted derivatives of these cycloolefins. Random repeating units derived from these cycloolefin materials can comprise from 1 mole % to 40 mole % of this type of elastomeric polymer component.

The $C_3$ to $C_{20}$ α-olefins used to form such copolymers can, for example, be selected from propylene, 1-butene, 1-pentene, 1-hexene, 4-methyl-1-pentene, 1-octene, 1-dodecene, 1-tetradecene, 1-hexadecene, 1-octadecene, 1-eicosene and mixtures thereof. Random repeating units derived from these $C_3$ to $C_{20}$ α-olefin materials can comprise from 1 mole % to 45 mole % of this type of elastomeric polymer component.

Another class of useful elastomeric polymers which can be utilized in the process and polymer compositions herein is represented by amorphous or low-crystalline flexible olefinic copolymers comprising at least two components selected from the group consisting of an ethylene component, a propylene component, and an α-olefin components having 4 to 20 carbon atoms. Such copolymers are in general ethylene-propylene copolymer rubbers (EPR), ethylene-α-olefin copolymer rubbers and propylene-α-olefin copolymer rubbers. The α-olefin in such copolymer rubbers can be selected, for example, from 1-butene, 1-pentene, 1-hexene, 4-methyl-1-pentene, 1-octene and 1-decene.

The molar ratio of ethylene to α-olefin in the ethylene-α-olefin copolymer rubbers can vary depending on the types of the α-olefins, but can generally be in the range of from 30/70 to 95/5, or even from 50/50 to 95/5. When the α-olefin is propylene, this molar ratio can be in the range of from 50/50 to 90/10, while when the α-olefins are those of four or more carbon atoms, this molar ratio can be in the range of from 80/20 to 95/5.

The molar ratio of propylene to α-olefin in the propylene-α-olefin copolymer rubbers can also vary depending on the types of the α-olefins, but is generally in the range of from 50/50 to 95/5. When the α-olefin is 1-butene, this molar ratio can be in the range of from 50/50 to 90/10, while when the α-olefins are those of five or more carbon atoms, this molar ratio can be in the range of from 80/20 to 95/5.

The ethylene, propylene, and α-olefin copolymer rubbers hereinbefore described may also be graft-modified in conventional fashion with, for example, from 0.01 wt % to 5 wt %, or even from 0.1 wt % to 4 wt %, of graft monomers selected from unsaturated carboxylic acids or derivatives thereof. Examples of the unsaturated carboxylic acids and derivatives thereof which can used for modification of the ethylene-propylene-α-olefin copolymer rubbers herein can include such unsaturated carboxylic acids as acrylic acid, maleic acid, fumaric acid, tetrahydrophthalic acid, itaconic acid, citraconic acid, crotonic acid, isocrotonic acid, and Nadic Acid® (endo-cis-bicyclo[2,2,1]hept-5-ene-2,3-dicarboxylic acid), and derivatives thereof such as acid halides, amides, imides, anhydrides, and esters. Specific examples of these acid derivatives include malenyl chloride, maleimide, maleic anhydride, citraconic anhydride, monomethyl maleate, dimethyl maleate, and glycidyl maleate. Among these materials, unsaturated dicarboxylic acids and derivatives thereof such as acid anhydrides thereof are especially useful. Maleic acid, Nadic Acid®, and anhydrides thereof are specific examples of this type of acid materials.

Another class of useful elastomeric polymers which can be utilized in the process and polymer compositions herein is represented by flexible olefin/nonconjugated diene copolymers comprising a nonconjugated diene component and at least two components selected from the group consisting of an ethylene component, a propylene component, and α-olefin components having 4 to 20 carbon atoms. Such copolymers are in general ethylene-propylene-diene monomer (EPDM) copolymer rubbers, ethylene-α-olefin-diene copolymer rubbers and propylene-α-olefin-diene copolymer rubbers. Examples of α-olefins which can be used in these olefin-diene copolymers include the same materials listed hereinbefore for the ethylene and propylene copolymer rubbers.

Examples of the diene components for the ethylene-propylene-diene copolymer rubbers, ethylene-α-olefin-diene copolymer rubbers, or the propylene-α-olefin-diene copolymer rubbers include acyclic linear or branched non-conjugated dienes, such as 1,4-hexadiene, 1,6-octadiene, 2-methyl-1,5-hexadiene, 6-methyl-1,5-heptadiene, and 7-methyl-1,6-octadiene; and cyclic non-conjugated dienes such as 1,4-cyclohexadiene, dicyclopentadiene, 4-vinyl-1-cyclohexene, methyltetrahydroindenes, 5-vinyl-2-norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene. Among these materials, 7-methyl-1,6-octadiene, 1,4-hexadiene, 1,6-octadiene, and cyclic non-conjugated dienes such as 5-ethylidene-2-norbornene, 5-vinyl-2-norbornene, 5-methylene-2-norbornene, and 4-vinyl-1-cyclohexene are especially useful.

The molar ratio of ethylene to α-olefin in the ethylene-α-olefin-diene copolymer rubbers can vary depending on the types of the α-olefins, but can generally be in the range of from 50/50 to 95/5. When the α-olefin is propylene, this molar ratio can range from 50/50 to 90/10. When the α-olefins are those of four or more carbon atoms, this molar ratio can be in the range of from 80/20 to 95/5. The content of the diene component in the ethylene-propylene-diene or ethylene-α-olefin-diene copolymer rubbers can be in the range of from 0.5 to 10 mole %, or even from 0.5 to 5 mole %.

The molar ratio of propylene to α-olefin in the propylene-α-olefin-diene copolymer rubbers can vary depending on the types of the α-olefins, but can generally be in the range of from 50/50 to 95/5. When the α-olefin is 1-butene, this molar ratio can be in the range of from 50/50 to 90/10. When the α-olefins are those of five or more carbon atoms, this molar ratio can be in the range of from 80/20 to 95/5. The content of the diene component in the propylene-α-olefin-diene copolymer rubbers can be in the range of from 0.5 to 10 mole %, or even from 0.5 to 5 mole %.

Another class of useful elastomeric polymers which can be utilized in the process and polymer compositions herein is represented by flexible diene/aromatic vinyl copolymers selected from the group consisting of random copolymers and block copolymers, each said copolymer comprising a conjugated diene component and an aromatic vinyl hydrocarbon component, as well as the hydrogenation products of these copolymers. Such copolymers are most commonly represented by styrene-butadiene block copolymer rubbers, (d) styrene-butadiene-styrene block copolymer rubbers, (e) styrene-isoprene block copolymer rubbers, (f) styrene-isoprene-styrene block copolymer rubbers, (g) hydrogenated styrene-butadiene-styrene block copolymer rubbers, (h) hydrogenated styrene-isoprene-styrene block copolymer rubbers, and (i) maleated or otherwise functionalized and/or grafted derivatives of such copolymer rubbers.

The molar ratio of styrene to butadiene in the styrene-butadiene block copolymer rubbers can generally be in the range of from 1/99 to 60/40. The molar ratio of styrene to butadiene in the styrene-butadiene-styrene block copolymer rubbers can generally be in the range of from 1/99 to 60/40. The degree of polymerization of styrene in each block can generally be in the range of from 10 to 5,000, and the degree of polymerization of butadiene in each block can generally be in the range of from 10 to 20,000.

The molar ratio of styrene to isoprene in the styrene-isoprene block copolymer rubbers can generally be in the range of from 1/99 to 60/40. The molar ratio of styrene to isoprene in the styrene-isoprene-styrene block copolymer rubbers can generally be in the range of from 1/99 to 60/40. The degree of polymerization of styrene in each block can generally be in the range of from 1 to 5,000, and the degree of polymerization of isoprene in each block can generally be in the range of from 10 to 20,000.

The hydrogenated styrene-butadiene-styrene block copolymer rubbers are copolymer rubbers wherein double bonds left in the styrene-butadiene-styrene block copolymer rubbers are partially hydrogenated and the weight ratio of styrene to butadiene-derived component can generally be in the range of from 1/99 to 50/50. The hydrogenated styrene-isoprene-styrene block copolymer rubbers are copolymer rubbers wherein double bonds left in the styrene-isoprene-styrene block copolymers are partially hydrogenated and the weight ratio of styrene to isoprene-derived component can generally be in the range of from 1/99 to 50/50.

The aromatic vinyl hydrocarbon-conjugated diene block copolymers useful herein can have a weight-average molecular weight, $M_w$, as measured by GPC which ranges from 500 g/mole to 2,000,000 g/mole, or even from 10,000 g/mole to 1,000,000 g/mole. The density of these block copolymers can range from 0.80 to 1.10 g/cm$^3$, or even from 0.88 to 0.96 g/cm$^3$.

Another class of useful elastomeric polymers which can be utilized in the process and polymer compositions herein is represented by amorphous or low-crystalline homopolymers, as well as the hydrogenation products of these homopolymers. Such homopolymers and hydrogenated homopolymers can include, for example, substantially atactic polypropylene, polybutadiene, polyisoprene, hydrogenated polybutadiene and hydrogenated polyisoprene. These homopolymers and hydrogenated homopolymers useful herein can have a weight-average molecular weight, $M_w$, as measured by GPC which ranges from 500 g/mole to 2,000,000 g/mole, or even from 10,000 g/mole to 1,000,000 g/mole.

The aromatic vinyl/non-conjugated diene copolymers and the elastomeric homopolymers hereinbefore described, like the ethylene, propylene, and α-olefin copolymer rubbers, can also be graft-modified in conventional fashion with, for example, from 0.01 wt % to 5 wt %, or even from 0.1 wt % to 4 wt %, of graft monomers selected from unsaturated carboxylic acids or derivatives thereof. Suitable acids and acid derivatives for such graft modification are the same as those hereinbefore described with respect to modification of the ethylene, propylene, and α-olefin copolymer rubbers.

The hereinbefore-described various types of elastomeric polymers which are useful in the process and polymer compositions herein are all known materials. They can be prepared in conventional manner by polymerizing the appropriate types and amounts of their constituent comonomers using standard polymerization techniques. Many of these elastomeric materials are commerically available and can thus be readily obtained for use in the process and compositions herein. Elastomers particularly useful herein, for example, are marketed under the tradenames Vistalon® (ethylene/propylene/5-ethylidene-2-norbornene terpolymer), Vector® (styrene-butadiene triblock copolymer), Kraton® (styrene-hydrogenated butadiene diblock copolymer), and Exxelor® (maleated ethylene-propylene copolymer)

C) Liquid Reaction Medium

To carry out the process herein for preparing the desired polymer compositions, at least one ethylene-dicyclopentadiene copolymer component and at least one elastomeric polymer component, both as hereinbefore described, can be placed together in a common liquid reaction medium. Such a liquid reaction medium will generally be one in which both of the polymer components will be susceptible to hydrogenation by contacting with hydrogen, generally in the presence of one or more appropriate hydrogenation catalysts. As described more fully hereinafter, both hydrogen and hydrogenation catalysts will generally be added to or contacted with the common liquid reaction medium. Thus the common liquid reaction medium will generally comprise a suitable diluent (e.g, a reaction solvent) in which the reactants and other adjuncts such as catalyst materials can be dissolved, suspended or dispersed. (For purposes herein, a liquid which does not participate in the reaction as a reactant and which forms the common liquid reaction medium is referred to herein as a "diluent" or a "reaction solvent" even though not all of the materials within the reaction medium will necessarily be completely dissolved in or miscible with such a liquid.)

Suitable diluents or reaction solvents include organic liquids which are inert in the reaction mixture. By "inert" as used herein in conjunction with diluents or reaction solvents is meant that the diluent or solvent does not deleteriously affect the hydrogenation reaction relative to its absence and does not increase the formation of non-hydrogenated reaction products.

Such suitable inert organic solvents can include aromatic hydrocarbons such as benzene, toluene, xylenes, benzonitrile, chlorobenzene, o-dichlorobenzene, 1,2,4-trichlorobenzene, nitrobenzene, anisole, and phenyl nonane; saturated aliphatic hydrocarbons having from about 6 to about 20 carbons, such as cyclohexane; halogenated hydrocarbons such as methylene chloride, 1,2-dichloroethane, tetrachloroethane, chloroform, and carbon tetrachloride; and, particularly in cases involving functional E/DCPD copolymer derivatives, aliphatic ethers such as tetrahydrofuran. Mixtures or blends of diluents or solvents may also be utilized herein to form the common liquid reaction medium. Especially desirable organic solvents for use herein include o-dichlorobenzene, toluene, cyclohexane, tetrachloroethane, chlorobenzene, and mixtures thereof.

D) Polymer Composition Preparation Process

The process disclosed herein is one by which the desired polymer compositions herein can be prepared form the two types of olefinic polymer components hereinbefore described. As the first steps in such a process, both the E/DCPD copolymer component and the elastomeric polymer component are co-dissolved in the common liquid reaction medium hereinbefore described. This liquid reaction medium with the two polymer components dissolved therein is then subjected to hydrogenation conditions to hydrogenate some or all of the unsaturated materials within the reaction medium. Upon completion of the hydrogenation step, the resulting hydrogenated polymer materials can then be co-precipitated from the liquid reaction medium in the form of the desired polymeric compositions herein.

Within the common liquid reaction medium, the E/DCPD copolymer component and the elastomeric polymer will be added in accordance with the process herein in amounts relative to each other which depend on the desired properties and intended use of the hydrogenated polymer composition which is eventually co-precipitated out of the liquid reaction medium. For hydrogenated co-precipitated polymer combinations which are useful as or in impact-modified structural polyolefins, the weight ratio of the E/DCPD copolymer component to the elastomeric polymer component can generally range from 99:1 to 50:50, within the common liquid reaction medium. Alternatively, the weight ratio of E/DCPD copolymer component to elastomeric polymer component can range from 95:5 to 60:40, within the common liquid reaction medium.

The total amount of the E/DCPD and elastomeric polymer materials to be hydrogenated in-situ, relative to the total amount of common liquid reaction medium, e.g., the organic reaction diluent or solvent, can vary widely. Enough of the organic reaction solvent will generally be utilized in order to completely dissolve or uniformly suspend or disperse the polymeric components within the liquid reaction medium. Frequently, the E/DCPD and elastomeric polymer components to be functionalized will comprise from 0.1 wt/vol % to 20.0 wt/vol % of the total common liquid reaction medium. Alternatively, the E/DCPD and elastomeric polymer components to be hydrogenated in-situ can comprise from 0.25 wt/vol % to 15.0 wt/vol % of the total common liquid reaction medium. Or, they can comprise from 0.50 wt/vol % to 10.0 wt/vol % of the total common liquid reaction medium.

Once both polymer components are dissolved within the common liquid reaction medium, the medium, in accordance with the process herein, will be subjected to hydrogenation conditions which are sufficient to at least partially hydrogenate the residual double bond moieties within the E/DCPD copolymer component. Alternatively, the liquid reaction medium with the two types of polymer components dissolved therein can be subjected to hydrogenation conditions which are sufficient to completely hydrogenate the residual double bond moieties within the E/DCPD copolymer component.

Typically, partial hydrogenation of the E/DCPD copolymer will involve hydrogenation of at least 5%, or at least 25%, or at least 75%, of the DCPD-derived comonomers (comonomer units) within the copolymer which have residual bonds therein prior to hydrogenation. Complete hydrogenation of the E/DCPD copolymer will, of course involve hydrogenation of all, i.e., 100%, of the DCPD-derived comonomer units within the copolymer which have residual bonds therein prior to hydrogenation.

In another embodiment of the process herein, the elastomeric component within the liquid reaction medium will also contain residual double bonds. For example, elastomeric copolymers of the flexible olefin/diene type such as ethylene/propylene/5-ethylidene-2-norbornene terpolymer (e.g., Vistalon® 7001) or ethylene/1-octene/4-vinyl-1-cyclohexene elastomer will generally, like the E/DCPD copolymer component, contain residual unsaturation. In that instance, the elastomeric component can also be partially, or even completely, hydrogenated (in addition to the having the E/DCPD copolymer hydrogenated to partially or completely eliminate its residual unsaturation).

Once the two essential components are dissolved in the common liquid reaction medium, the medium can be subjected to hydrogenation conditions which serve to bring about the desired type and extent of hydrogenation of the polymer components within the reaction medium. The hydrogenation conditions employed will generally involve contacting the polymer components within the reaction medium with hydrogen in the presence of a suitable hydrogenation catalyst or stoichiometric hydrogenation reagent under appropriate hydrogenation conditions of temperature and hydrogen pressure.

Any conventional hydrogenation catalyst or stoichiometric reagent may be employed in the hydrogenation procedure. Such catalysts can include, for example, $RuClH(CO)(PPh_3)_3$, $Co(acac)_3/Bu_3Al$, nickel silica alumina, nickel/tungsten sulfides, Co-octanoate/$Et_3Al$, platinum/palladium, Pd/C, $Rh(PPh_3)_3Cl$, and the like. (In these formulas, Ph is phenyl, acac is acetylacetonoate, Bu is butyl and Et is ethyl.) Such hydrogenation catalysts may be homogenous or heterogeneous (e.g., supported on silicates or aluminum oxides) in form. Suitable hydrogenation catalysts, catalyst systems, and catalyst supports are described in greater detail in U.S. Pat. Nos. 6,191,243 and 6,476,153, both of which are incorporated herein by reference. Such stoichiometric hydrogenation reagents can include, for example, para-toluenesulfonhydrazide, as described in Naga et al. *Polymer* 2006, 47, p. 520, herein incorporated by reference.

Hydrogenation conditions can also include conventional hydrogenation reaction temperatures and hydrogen pressures. Hydrogenation temperatures can range, for example, from 45° C. to 180° C., or from 80° C. to 140° C. Hydrogen pressures of from 200 psig (1379.0 kPa) to 1600 psig (11,031.6 kPa), or from 600 psig (4136.9 kPa) to 1000 psig (6894.8 kPa), may also be employed. Hydrogenation levels for both types of polymer components within the reaction medium can be complete (100%), or partial (e.g., at least 5% or from 5% to 99.9%), of the residual double bonds which are present within the two types of polymer materials prior to the hydrogenation step.

Once hydrogenation has been effected to the desired extent, the two types of polymer components within the liquid reaction medium can be recovered as a single polymer composition by co-precipitating them together from the reaction medium. Such post-hydrogenation co-precipitation can be brought about by combining with the reaction medium liquid a precipitation-inducing agent which renders both of said polymer components insoluble within the resulting liquid/agent combination. Suitable co-precipitation-inducing agents can include organic liquids such as methanol, isopropanol, acetone, hexane, or mixtures thereof. Water and/or aqueous mineral acids or organic acids can also be further added to the co-precipitation-inducing agent or reaction medium to induce co-precipitation of the desired polymer combination. The co-precipitated recovered material can then be further washed, re-precipitated, re-filtered and dried to provide the desired polymer composition in usable form.

In the simplified process herein for preparing blends of DCPD-based copolymers with elastomeric polymers, the precursor E/DCPD material and the desired elastomer are advantageously co-dissolved in a solvent prior to hydrogenation of the E/DCPD copolymer. The E/DCPD copolymer is then hydrogenated in the presence of the elastomer (or concurrently along with some or all of any olefin units present in the elastomer), and the two materials are efficiently coprecipitated in a manner similar to solution-blending. No added dissolution or precipitation steps are required for the solution-blending process over and above those of the hydrogenation process. In contrast, a traditional solution-blending protocol would involve separate steps for the hydrogenation of the E/DCPD copolymer and the solution-blending of the resultant hydrogenated E/DCPD (H-E/DCPD) copolymer with the elastomeric polymer.

E) In-Situ-Formed Polymer Compositions

In its composition aspects, the present disclosure also relates to polymeric compositions, e.g., mixtures, which are combinations of (a) an at least partially hydrogenated ethylene-dicyclopentadiene copolymer component, and (b) an elastomeric polymer component. Such polymer combinations are those formed by dissolving these two types of polymer components or precursors thereof, both as hereinbefore described in all their variations, in a common liquid reaction medium and by thereafter co-precipitating both materials from the reaction medium to realize the desired hydrogenated polymer compositions herein.

Generally the at least partially hydrogenated ethylene-dicyclopentadiene copolymer component can be formed in-situ within the liquid reaction medium. This can be accomplished by subjecting the liquid reaction medium containing an unsaturated E/DCPD copolymer component having residual double bonds therein to hydrogenation conditions which serve to effect the desired as least partial hydrogenation of the E/DCPD material. And in a further composition embodiment, the elastomeric polymer component is also at least partially hydrogenated in-situ within the liquid reaction medium to eliminate unsaturation present when this polymer component was dissolved in the reaction medium. The polymer blends prepared using the tandem hydrogenation/solution-blending method described herein are novel compositions which may exhibit morphologies, stabilities, and properties arising from the partial or complete hydrogenation of any olefin units present in the elastomer component.

Compositions having an appropriate ratio of E/DCPD copolymer component to elastomeric polymer component therein are suitable for molding into useful materials such as structural polyolefin materials having desirable thermal and impact resistance. Such mixtures of polymers will generally exhibit two distinct glass transition temperatures. For example, such compositions can have a first $T_g$ which ranges from $-80°$ C. to $0°$ C. and a second $T_g$ which can range from $85°$ C. to $190°$ C. It should be noted that in some cases, these separate $T_g$s may not be experimentally observable by DSC techniques due to weakness. Within such compositions, the weight ratio of E/DCPD copolymer component to elastomeric polymer component can generally range from 99:1 to 50:50. Alternatively, the weight ratio of these two components within the polymer compositions herein can range from 95:5 to 60:40.

F) Thermoplastic Polyolefin Product and Uses

The co-precipitated polymer compositions herein can be used as, or in, thermoplastic polyolefin products which are suitable for use in structural applications. Such polymer compositions can be the sole component in such thermoplastic polyolefin products.

Alternatively, the polymer compositions herein can be combined with other components within such polyolefin products. Other such product components can include, for example, other types of polyolefins such as α-olefin homopolymers, α-olefin copolymers, and other copolymers of α-olefins and cyclic olefins. Such other polyolefin product components can also include a wide variety of polymeric materials which can serve as impact modifiers or which can serve to alter and improve other properties of the thermoplastic polyolefin products in order to enhance their suitability for structural or other applications. These polyolefin products can also optionally comprise a wide variety of fillers, such as talcs, glass fibers, or other inorganic materials; compatibilizing polymers; oligomers or small-molecule compounds; colorants; carbon black; and other additional components used to formulate blends and filled blends.

Generally, the co-precipitated polymer compositions herein can comprise at least 40 wt % of such thermoplastic polyolefin products. Alternatively, these polymer compositions can comprise at least 50 wt %, and or even at least 60 wt %, of such thermoplastic polyolefin products.

Test Methods and Analytical Procedures

The various parameters and properties used to characterize the polymeric materials described herein can be determined using conventional or well known analytical or testing methodology, procedures and apparatus. For purposes of determining values for the parameters and characteristics provided for the polymeric materials of this disclosure, the following methods and procedures are employed.

Solution $^1$H nuclear magnetic resonance (NMR) spectra of polymers were collected on a JEOL Delta 400 spectrometer equipped with a 5 mm broadband probe or a Varian UnityPlus 500 MHz instrument equipped with a 5 mm switchable probe. Spectra were taken in $d_2$-tetrachloroethane ($d_2$-TCE) or $d_4$-o-dichlorobenzene ($d_4$-ODCB) at $120°$ C. Compositional analysis for E/DCPD copolymers was performed by integrating the olefin resonances (5.6 and 5.5 ppm, total 2H) and optionally the allylic bridgehead resonance (3.1 ppm, 1H), the non-allylic bridgehead resonance (2.5 ppm, 1H), and the cyclopentenyl $CH_2$ and chain C$\underline{H}$ resonances (2.2-1.9 ppm, total 4H, when resolved). After correcting the rest of the aliphatic region for DCPD content, the remainder of the aliphatic integral was assigned to ethylene (E). Compositional analysis for hydrogenated E/DCPD (H-E/DCPD) copolymers was performed by integrating the hydrogenated DCPD unit (HDCPD) bridgehead methine resonances (2.4 ppm, total 2H). After correcting the aliphatic region for HDCPD content, the remainder of the aliphatic integral was assigned to ethylene. Compositional analysis for poly(ethylene-co-propylene-co-5-ethylidene-2-norbornene) (E/P/ENB)

copolymers was performed similarly using the 5-ethylidene-2-norbornene (ENB) ethylidene resonances (two d at 5.25 and 5.03 ppm, trisubstituted olefin C$\underline{H}$, 1H) and the propylene (P)CH$_3$ resonance (0.9 ppm, tr, 3H; the average of $^1$H and $^{13}$C NMR values is reported. Compositional analysis for poly(ethylene-co-1-octene-co-4-vinyl-1-cyclohexene) copolymers was performed similarly using the vinyl-1-cyclohexene (VCH) olefin resonances (5.8-5.6 ppm, br s, 2H) and the 1-octene (O)CH$_3$ resonance (1.0-0.8 ppm, tr, 3H); the average of $^1$H and $^{13}$C NMR values is reported.

Solution $^{13}$C NMR spectra of polymers were collected on a Varian Inova 300 MHz or Varian UnityPlus 500 MHz spectrometers equipped with 10 mm broadband probes in d$_2$-TCE or d$_4$-ODCB at 120° C. Cr(acac)$_3$ (~15 mg/mL) was used as a relaxation agent. Compositional analysis for poly(ethylene-co-propylene-co-5-ethylidene-2-norbornene) copolymers was performed similarly using the 5-ethylidene-2-norbornene ethylidene resonances (two d at 148 and 112 ppm, olefin, 2C; and s at 15 ppm, $\underline{C}$H$_3$, 1C) and the propylene CH$_3$ resonance (20.5 ppm, s, 1C); the average of $^1$H and $^{13}$C NMR values is reported. Compositional analysis for poly(ethylene-co-1-octene-co-4-vinyl-1-cyclohexene) copolymers was performed similarly using the vinyl-1-cyclohexene olefin resonances (128 ppm, 2 peaks, 2C) and the 1-octene CH$_3$ resonance (14 ppm, s, 1C); the average of $^1$H and $^{13}$C NMR values is reported.

GPC molecular weights for all copolymers reported versus polystyrene (PS) or polyethylene (PE) in 1,2,4-trichlorobenzene, using either (1) a Waters Associates 2000 GPC at 135° C. with three Polymer Laboratories mixed bed high-porosity Type LS B columns (10 µm particle size, 7.8 mm inner diameter, 300 mm length), an internal Waters DR1 detector, and a Wyatt MiniDawn EOS 3-angle LS detector (flow rate 0.54 mL/min; typical sample concentration 2 mg/mL; 300 µL injection loop); or (2) a Waters Associates 150C High Temperature GPC at 145° C. equipped with three Polymer Laboratories mixed bed high-porosity Type B columns (similar dimensions) and an internal DR1 detector (flow rate 0.5 or 1.0 mL/min; typical sample concentration 1-2 mg/mL). Polystyrene (PS) standards (17 in total) were used for instrument calibration and when appropriate, a polyethylene (PE) calibration curve was generated via a universal calibration software program (Sun, T., et al., *Macromolecules*, 2001, 34, p. 6812) using the Mark-Houwink coefficients for PS and PE. In some cases, data initially reported versus PE were converted back to PS calibration values for comparison using the relationship: polystyrene-based molecular weight in kg/mole= [(polyethylene-based molecular weight in kg/mole)-(3.1692 kg/mole)]/(0.3914 kg/mole). E/DCPD materials exhibited reversed signal polarity from PE.

Gel Permeation Chromatography-3-Dimensional Light Scattering (GPC-3DLS) molecular weights for copolymers were determined using a Waters Associates 150C Gel Permeation Chromatograph equipped with three Polymer Laboratories mixed bed Type B columns (10 µm particle size, 7.8 mm inner diameter, 300 mm length), an internal Waters differential refractive index (DRI) detector, a 717 WISP autosampler, a Waters 410 external refractive index detector, a Viscotek 150R+ viscometer, and a Precision Detectors 90° light scattering detector. The mobile phase was tetrahydrofuran, with 2 v/v % added acetic anhydride (AA) at 30° C. (flow rate 0.49 mL/min; typical sample concentration 3 mg/mL; 100 mL injection loop). The instrument was calibrated with a known polystyrene standard (American Standards "105,000") followed by parameter generation and analysis using Trisec 3.0 software.

DSC data were obtained on a TA Instruments model 2920 calorimeter using a scan rate of 10° C./minute, from room temperature or low temperature (−125-25° C.) to 160-250° C. (exact temperature range dependent upon polymer identity). Glass transition temperature (T$_g$) midpoints and melt transition (T$_m$) maxima are taken from the second heat cycle. Thermogravimetric analysis (TGA) data were taken using a TA Instruments 2950 High-Res TGA scanning at 25-600° C. in air at 10° C./minute; decomposition onset values are extrapolated.

Chemical composition distribution (CCD) analysis was measured using a model 200 PolymerChar S. A. Crystallization Analysis Fractionation (CRYSTAF) instrument. The polymer sample (20-30 mg) was dissolved in 30 mL ODCB (stabilized with 0.125 g/L 2,6-di-t-butyl-4-methylphenol) at 160° C. for 60 minutes and equilibrated at 100° C. for 45 minutes, followed by cooling to 30° C. at a rate of 0.2 K/min (analysis time ~9 hours). A two-wavelength infrared detector was used to measure polymer concentration during crystallization (3.5 µm, 2853 cm$^{-1}$ sym. stretch) and to compensate for baseline drifts (3.6 µm) during analysis. The solution polymer concentration was monitored at intervals yielding a cumulative concentration curve. The derivative of this curve with respect to temperature represents the weight fraction of crystallized polymer at each temperature ("% soluble by CRYSTAF").

EXAMPLES

The following examples illustrate the presently disclosed polymer compositions and preparation process embodiments and the advantages provided thereby without limiting the scope thereof.

Comparative Example C1

Synthesis of Hydrogenated Poly(Ethylene-Co-Dicyclopentadiene) (H-E/DCPD) Copolymer Containing 38.8 Mole % Hydrogenated DCPD (HDCPD)

A 10 g portion of an E/DCPD copolymer containing 40.0 mole % DCPD by $^1$H NMR (57.4 mmol DCPD units; further characterization given in Table 1) was dissolved in 140 mL anhydrous o-dichlorobenzene (ODCB) at room temperature overnight in a glass liner for a 300 mL Parr reactor. Separately, Rh(PPh$_3$)$_3$Cl (Wilkinson's catalyst, 95 mg, 0.103 mmol, 560:1 diene:Rh) and PPh$_3$ (928 mg, 3.54 mmol, 34.5:1 P:Rh) were each dissolved in 5 mL ODCB and added to the polymer solution. The reactor was quickly assembled, charged to 800 psig (5515.8 kPa) H$_2$, and heated to 105° C. for 22 hours with stirring. Subsequently, the reactor was vented, cooled, and opened to the atmosphere. The contents of the liner were added to an excess of methanol to precipitate the polymer. This hydrogenation procedure was repeated five times with five additional 10 g portions of the E/DCPD copolymer, and the combined materials were re-dissolved twice in tetrachloroethane (TCE, ca. 3/5 original volume of ODCB) at 80-85° C., filtered to remove decomposed catalyst particles, and reprecipitated into warm methanol followed by agitation of the precipitated polymer/methanol mixture in a Waring blender. No residual DCPD olefin resonances were seen by $^1$H NMR. The white hydrogenated polymer was dried for 60 hours in a vacuum oven at 60° C. (58.3 g, 96%). Full characterization of the E/DCPD precursor and the hydrogenated H-E/DCPD product is given in Table 1.

TABLE 1

Full characterization of precursor E/DCPD and product H-E/DCPD polymers of Comparative Example C1.

| Material | Mol. comonomer (%)[a] | $T_g$ (°C.) | $T_m$ (°C.) | TGA dec. onset (°C.)[b] | GPC $M_w$; $M_n$ (vs PE, g/mole) | GPC $M_w$; $M_n$ (vs PS, g/mole) | GPC-3DLS $M_w$; $M_n$ (g/mole) |
|---|---|---|---|---|---|---|---|
| E/DCPD | 40.0 DCPD | 121.2 | ~135[c] | NA | 66,060; 29,420 | 160,680; 67,070 | 173,000; 91,600 |
| H-E/DCPD | 38.1 HDCPD[d] | 134.8 | 124.0[e] | 415.7[f] | 61,080; 36,970 | 140,260; 83,040 | — |

NA or — = Not analyzed for given property or under given conditions.
[a]By NMR, as described in Test Methods and Analytical Procedures.
[b]In air; value reported is the main (major) decomposition onset (see footnote f).
[c]From minor amount of homo-polyethylene; very small; observed as a slight deflection at the upper end of the $T_g$ transition; sample was 93.2% soluble by CRYSTAF.
[d]Thought to contain residual TCE.
[e]From minor amount of homo-polyethylene, small; $H_f$~0.21 kJ/mol.
[f]Earlier minor weight loss (4.2%) was also observed, onsetting at 269° C.

Comparative Example C2

Preparation of H-E/DCPD/Elastomer Blend by Melt-Mixing Using Pre-Hydrogenated H-E/DCPD Copolymer The H-E/DCPD material prepared in Comparative Example C1 was stabilized by addition of 0.1 wt % Irganox® XP60 and 0.1 wt % Irgafos® 168 (as powders, followed by orbital shaker agitation of the two solids to mix the polymer with the stabilizers). The polymer was then mixed in an 80:20 weight ratio with Vector® 8508 styrene-butadiene-styrene (SBS) triblock (characterization given in Table 2). This mixture was injection-molded into rectangular impact bars of dimension 63×12×3 mm using a DSM Research B.V. model 2002-16-16 Injection Molding Machine equipped with a DSM 5 cc Micro Extruder (100 rpm feed out/2 minute mixing; extruder temperature 260-265° C.; transfer temperature 220-224° C.; mold temperature 61° C.). The bars appeared brown and opaque; some bars showed voids in the interior following analysis. Bars of neat H-E/DCPD were similarly prepared as a comparative. The bars appeared grey and opaque; some small voids were detected in the bar interiors following analysis. Additional bars of neat H-E/DCPD molded at an extruder temperature of 270° C. exhibited significant voiding (and lowered weights) due to outgassing of residual solvent during molding. All bars were individually weighed to provide additional relative characterization of quality (greater weight=fewer voids).

Comparative Example C3

Property Comparison Between Injection-Molded Samples of H-E/DCPD/SBS Rubber Blend Made by Melt-Mixing and Neat H-E/DCPD The sample bars prepared in Comparative Example C2 were subjected to three-point flexural modulus testing (room temperature, 50% humidity) using an Instron Series IX tester (4500 Series interface, System 1.15, 200 lbs or 1125 lbs, 1% secant strain, 10.000 pts/sec sample rate, 0.0500 in/min crosshead speed). Notched Izod impact tests in units of ft-lb were performed using a Tinius Olsen model TI/0.2H plastic impact tester (0-25 inch-lb capacity) with a manual 1-10 reading scale and a Standard Environmental Systems cryogenic attachment. Notched Izod impact tests in units of ft-lb/in were conducted using a TMI Izod Impact Tester (ASTM D256; 45° notch; 2.028 ft-lb pendulum). All bars showed complete break upon impact. Results are summarized in Table 3.

The data shown in Table 3 demonstrate, in a general fashion, that elastomers can be used to improve the impact properties of H-E/DCPD copolymers by the standard technique of melt-mixing. The data indicate that the room temperature Izod impact of the H-E/DCPD/SBS rubber blend, measured in ft-lb/in, is enhanced compared to neat H-E/DCPD (1.158 ft-lb/in versus ≤0.243 ft-lb/in). When the H-E/DCPD is rubber-toughened, it no longer breaks upon failure during flexural modulus testing. While data taken in units of ft-lb from the manual impact tester (read from 1-10 dial scale) are not as

TABLE 2

Full characterization of H-E/DCPD and SBS rubber polymers of Comparative Example C2.

| Material | Mol. comonomer (%)[a] | $T_g$ (°C.) | $T_m$ (°C.) | TGA dec. onset (°C.)[b] | GPC $M_w$; $M_n$ (vs PE, g/mole) | GPC $M_w$; $M_n$ (vs PS, g/mole) | GPC-3DLS $M_w$; $M_n$ (g/mole) |
|---|---|---|---|---|---|---|---|
| H-E/DCPD | | | | Same as Table 1 | | | |
| Vector® 8508 SBS | 29% S, <1% diblock[c] | −93.8 | none | 407.7 | — | — | 71,700; 71,200 |

— = Not analyzed.
[a]By NMR, as described in Test Methods and Analytical Procedures.
[b]In air; value reported is the main (major) decomposition onset.
[c]Composition provided by supplier (wt or mole % not specified).

accurate as the ASTM D256 ft-lb/in measurements (particularly at scale extremes), they show that rubber-modified H-E/DCPD has greater room temperature and −29° C. Izod impact than neat H-E/DCPD (when averaged over all test samples).

Both $^1$H and $^{13}$C NMR analysis of the product showed the presence of both blend components (via propylene $CH_3$ resonances) indicating successful coprecipitation, and complete hydrogenation of both DCPD and 5-ethylidene-2-norbornene

TABLE 3

Flexural modulus and notched Izod impact properties of injection-molded samples of H-E/DCPD/SBS rubber blend made by melt-mixing and neat H-E/DCPD.

| Material | RT flex. mod., Kpsi, and failure mode[a] | RT Izod, 1-10 scale (inch-lb)[a] | RT Izod (ft-lb/in)[a] | −29° C. Izod, 1-10 scale (ft-lb) |
|---|---|---|---|---|
| Neat H-E/DCPD | 339 ± 14 (2) break | 9.5 (bar 1) 7.5 (bar 2)[b] | 0.243 (1)[d] 0.197 ± 0.040 (3)[b-d] | 1.50 (bar 1)[c,e] 0.50 (bar 2)[b,c,e] |
| 80:20 H-E/DCPD/ Vector ® 8508 | 261 (1) no break; stress wht. | 9.5 (bar 1) 9.0 (bar 2) stress wht. | 1.158 ± 0.011 (2)[f] | 1.50 (bar 1) 0.75 (bar 2)[b] |

[a]RT = room temperature; stress wht. = stress whitening observed; numbers in parentheses = number of bars tested.
[b]Secondary data for bar(s) visibly inferior to 1$^{st}$ bar.
[c]Bars suspected of having a large number of voids.
[d]Values as a function of bar weight (greater weight implying fewer voids): 0.167 (1.85 g), 0.182 (2.13 g), 0.243 (2.10 g).
[e]Values as a function of bar weight (greater weight implying fewer voids): 1.50 (2.47 g); 0.50 (2.37 g).
[f]Bars had some voids.

Example 1

Small Scale In Situ Tandem Solution-Blending/Hydrogenation of E/DCPD Copolymer with Ethylene/Propylene/5-Ethylidene-2-Norbornene Terpolymer Rubber This example demonstrates that the olefinic groups in an E/DCPD copolymer can be successfully hydrogenated in the presence of an ethylene/propylene/5-ethylidene-norbornene elastomer, and that the olefinic groups in the elastomer are also simultaneously hydrogenated.

A glass liner for a 300 cc Hasteloy C Parr reactor was charged with 35 mL ODCB, a stirbar, 2.4 g of the E/DCPD copolymer described in Comparative Example C1 (13.77 mmol DCPD units), and 0.6 g E/P/ENB elastomer (0.211 mmol ENB units) (full characterization is given in Table 4). The solution was stirred overnight at room temperature to effect dissolution of the polymers. The stirbar was then removed and the liner was inserted into the Parr reactor. Separately, 23 mg $(Ph_3P)_3RhCl$ (0.0249 mmol, 561:1 total olefin:Rh) and 227 mg $Ph_3P$ (0.865 mmol, 34.7:1 P:Rh) were each dissolved in 5 mL ODCB. Both solutions were added to the polymer solution (final polymer concentration 6.67 wt/vol %) and the reactor was assembled. After mechanical stirring was initiated, the reactor was pressurized to 200 psig (1379.0 kPa) $H_2$ and vented three times, followed by repressurization to 800 psig (5515.8 kPa) $H_2$ (single charge). The temperature was raised to 105° C. and the contents of the reactor were stirred at 105° C. overnight (20-22 h). The reactor was cooled and vented, and its contents were precipitated into 200 mL methanol. After manually cutting large solids into smaller pieces, the entire polymer solution (precipitate+solvents) was agitated in a Waring blender. The shredded polymer was collected by filtration, rinsed with methanol, and then redissolved in 133 mL TCE (2.25 wt/vol % polymer) at room temperature, reprecipitated into 470 mL methanol, and re-shredded in a Waring blender. After collection by filtration, the white, flexible, cohesive crumb was dried at 60° C. overnight (3.043 g; theo. yield of both components 3.030 g; quantitative).

olefin units to produce a blend of H-E/DCPD (similar to the H-E/DCPD produced similarly in Comparative Example C1) and an ethylene/propylene/5-ethyl-2-norbornene copolymer. DSC analysis showed the following features in the 2$^{nd}$ heat: $T_g$ 136.30C(H-E/DCPD); $T_m$ 43.3° C., br (hydrogenated E/P/ENB); $T_m$ 122.1° C., small ($\Delta H_f$ 0.27 J/g; minor homo-polyethylene present in E/DCPD). The expected $T_g$ for hydrogenated E/P/ENB at ~−40° C. was not observed, which may be due to weakness of the transition. A thin film of the blend was pressed at 245° C. for three minutes between two aluminum-coated plates using a PHI Company QL-433-6-M2 press, and then pressed at 7° C. in the cooling part of the press for 3 minutes. The film obtained from this un-optimized procedure was inhomogeneous but showed flexibility.

TABLE 4

Full characterization of E/DCPD, H-E/DCPD, and ethylene/propylene/5-ethylidene-2-norbornene (E/P/ENB) rubber polymers of Example 1.

| Material | Mol. comonomer (%)[a] | $T_g$ (° C.) | $T_m$ (° C.) | TGA dec. onset (° C.)[b] | GPC $M_w$; $M_n$ (vs PE, g/mole) |
|---|---|---|---|---|---|
| E/DCPD | | same as Table 1 | | | |
| H-E/DCPD | | same as Table 1 | | | |
| E/P/ENB[c] | 1.1 ENB, 15.4 P, 83.5 E | −41.8 | 40.9[d] | 411.7[e] | 169,800; 83,870[f] |

NA or — = Not analyzed for given property or under given conditions.
[a]By NMR, as described in Test Methods and Analytical Procedures.
[b]In air; value reported is the main (major) decomposition onset (see footnote e).
[c]Vistalon ® 7001.
[d]Very broad.
[e]Earlier minor weight loss was also observed, onsetting at ca. ≥255° C. (5.7 wt %).
[f]By light scattering analysis using PE parameters.

Example 2

Small Scale In Situ Tandem Solution-Blending/Hydrogenation of E/DCPD Copolymer with Ethylene/1-Octene/4-Vinyl-1-Cyclohexene (E/O/VCH) Terpolymer Rubber This example demonstrates that the olefinic groups in an E/DCPD copolymer can be successfully hydrogenated in the presence of an ethylene/1-octene/4-vinyl-1-cyclohexane elastomer, and that the olefinic groups in the elastomer are also simultaneously hydrogenated.

A glass liner for a 300 cc Hasteloy C Parr reactor was charged with 35 mL ODCB, a stirbar, 2.4 g of the E/DCPD copolymer described in Comparative Example C1 (13.77 mmol DCPD units), and 0.6 g of an E/O/VCH terpolymer having the composition 12.2 mole % 4-vinyl-1-cyclohexene, 22.7 mole % 1-octene, and 65.1 mole % ethylene (1.29 mmol VCH units; no further characterization). The solution was stirred overnight at room temperature to effect dissolution of the polymers. The stirbar was then removed and the liner was inserted into the Parr reactor. Separately, 25 mg $(Ph_3P)_3RhCl$ (0.027 mmol, 558:1 total olefin:Rh) and 245 mg $Ph_3P$ (0.934 mmol, 34.6:1 P:Rh) were each dissolved in 5 mL ODCB. Both solutions were added to the polymer solution (final polymer concentration 6.67 wt/vol %) and the reactor was assembled. After mechanical stirring was initiated, the reactor was pressurized to 200 psig (1379.0 kPa) $H_2$ and vented three times, followed by repressurization to 800 psig (5515.8 kPa) $H_2$ (single charge). The temperature was raised to 105° C. and the contents of the reactor were stirred at 105° C. overnight (20-22 h). The reactor was cooled and vented, and its contents were precipitated into 200 mL methanol. After manually cutting large solids into smaller pieces, the entire polymer solution (precipitate+solvents) was agitated in a Waring blender. The shredded polymer was collected by filtration, rinsed with methanol, and then redissolved in 133 mL TCE (2.25 wt/vol % polymer) at room temperature, reprecipitated into 470 mL methanol, and re-shredded in a Waring blender. After collection by filtration, the white, flexible crumb was dried at 60° C. overnight (3.047 g; theo. yield of both components 3.031 g; quantitative).

Both $^1H$ and $^{13}C$ NMR analysis of the product showed the presence of both blend components (via 1-octene $CH_3$ resonances) indicating successful coprecipitation, and complete hydrogenation of both DCPD and 4-vinyl-1-cyclohexene olefin units to produce a blend of H-E/DCPD (similar to the H-E/DCPD produced similarly in Comparative Example C1) and an ethylene/propylene/vinylcyclohexane copolymer. DSC analysis showed the following features in the $2^{nd}$ heat: $T_g$ −40.4° C. (hydrogenated E/O/VCH); $T_g$ 137.6° C. (H-E/DCPD); $T_m$ 124.5° C., small ($\Delta H_f$ 0.25 J/g; minor homopolyethylene present in E/DCPD). A thin film of the blend was pressed at 245° C. for three minutes in the manner described in Example 1. The film obtained from this un-optimized procedure was inhomogeneous and tore easily, but showed some flexibility (to a lesser extent than the film prepared in Example 1).

Comparative Example C4

Synthesis of Hydrogenated Poly(Ethylene-Co-Dicyclopentadiene) (H-E/DCPD) Copolymer Containing 43.8 Mole % Hydrogenated DCPD (HDCPD)

A 100 g portion of an E/DCPD copolymer containing 39.4 mole % DCPD by $^1H$ NMR (570.3 mmol DCPD units; further characterization given in Table 5) was hydrogenated using a procedure similar to Comparative Example C1 in a 2 L linerless Parr reactor. The amounts of reagents used were 1300 mL ODCB (to dissolve the copolymer), 942 mg (1.02 mmol) $Rh(PPh_3)_3Cl$ in 100 mL ODCB, and 9.22 g (35.13 mmol) $Ph_3P$ in 100 mL ODCB (final polymer concentration 6.7 wt/vol %; final diene:Rh 560:1). Following initial collection of the crude polymer and two reprecipitations from TCE and drying, 90.8 g (theo. yield 101.2 g, 90%) of a white solid was obtained, which exhibited residual TCE by $^1H$ NMR. A 50 g portion of this material was dissolved in 500 mL toluene, heated at reflux for a 30 minute period, precipitated by addition of a large excess of boiling methanol, and collected and dried under vacuum at 80° C. To remove residual toluene, this material was then dissolved in cyclohexane at room temperature (2.0 L) and reprecipitated into acetone (7.0 L) followed by agitation of the precipitated mixture in a Waring blender. A fine white powder (44 g after collection and drying) was obtained. No residual DCPD olefin resonances were seen by $^1H$ NMR. Full characterization of the E/DCPD precursor and the hydrogenated H-E/DCPD product is given in Table 5.

To exactly mimic the scale and conditions to be used subsequently in Examples 3 and 5 for tandem solution blending/hydrogenation, a second 20.0 g batch of the E/DCPD copolymer (114.06 mmol DCPD units) was hydrogenated in a linerless 2 L Parr reactor in a total of 300 mL ODCB solvent. The hydrogenation catalyst components used were 188 mg $(Ph_3P)_3RhCl$) (0.203 mmol; 562:1 total olefin:Rh) and 1.85 g $Ph_3P$ (7.05 mmol, 34.7:1 P:Rh), each added to the reactor as a solution in 33 mL ODCB (final polymer concentration 6.7 wt/vol %). After hydrogenation, the polymer solution was added to 1300 mL methanol to precipitate the product blend, which was collected by filtration after agitation in a Waring blender, re-precipitated from ~900 mL TCE into ~3.0 L methanol, re-collected, dried in a vacuum oven at 60° C., and subsequently reprecipitated again from ~800 mL cyclohexane into ~2.0 L acetone, re-collected, and re-dried. An 18.04 g of H-E/DCPD copolymer was obtained (89%; theo. yield 20.24 g); $^1H$ NMR analysis indicated no residual olefin resonances. Further characterization was not performed.

TABLE 5

Full characterization of precursor E/DCPD and product H-E/DCPD polymers of Comparative Example C4.

| Material | Mol. comonomer (%)[a] | $T_g$ (° C.) | $T_m$ (° C.) | TGA dec. onset (° C.)[b] | GPC $M_w$; $M_n$ (vs PE, g/mole) | GPC $M_w$; $M_n$ (vs PS, g/mole) | GPC-3DLS $M_w$; $M_n$ (g/mole) |
|---|---|---|---|---|---|---|---|
| E/DCPD | 39.4 DCPD[c] | 149.1 | none | NA | 74,890; 27,430 | 183,230; 61,990 | 193,100; 89,100 |
| H-E/DCPD | 43.8 HDCPD[d] | 143.1 | none | 421.4[e] | NA | 170,350; 78,620 | — |

NA or — = Not analyzed for given property or under given conditions.
[a]By NMR, as described in Test Methods and Analytical Procedures.
[b]In air; value reported is the main (major) decomposition onset (see footnote e).
[c]Contained 0.9 mole % toluene by $^1H$ NMR.
[d]Contained ≤0.08 wt % cyclohexane by $^1H$ NMR.
[e]Earlier minor weight loss was also observed, onsetting at 282° C. (3.3%).

Example 3

Large Scale In Situ Tandem Solution-Blending/Hydrogenation of E/DCPD Copolymer with Ethylene/Propylene/5-Ethylidene-2-Norbornene Terpolymer Rubber A procedure similar to the repeat (20 g-scale) hydrogenation procedure given in Comparative Example C4 was carried out in a linerless 2 L Parr reactor using 16.0 g of the E/DCPD copolymer described in Comparative Example C4 (91.25 mmol DCPD units) and 4.0 g of the E/P/ENB terpolymer described in Example 1 (1.408 mmol ENB units). The polymers were first dissolved overnight in 200 mL ODCB to give a cloudy solution (some gels); subsequently, 152 mg ($Ph_3P$)$_3$RhCl) (0.164 mmol; 565:1 total olefin:Rh) and 1.494 g $Ph_3P$ (5.69 mmol, 34.7:1 P:Rh) were each dissolved in 33 mL ODCB and added to the polymer solution, which was diluted to a final volume of 300 mL (final polymer concentration 6.7 wt/vol %). After hydrogenation, the polymer solution was added to 1300 mL methanol to precipitate the product blend, which was collected by filtration after agitation in a Waring blender, re-precipitated from 900 mL TCE into 3.0 L methanol, re-collected, and dried in a vacuum oven at 60° C. (19.36 g). $^1$H NMR analysis indicated the presence of residual TCE solvent. The blend material was then re-precipitated from 800 mL cyclohexane into 2.0 L acetone, re-collected, and re-dried to give 18.33 g of a lightweight flexible white crumb (91%; theo. yield 20.196 g). The $^1$H NMR spectra of the blend indicated only trace amounts of olefins and showed the presence of both polymer components in a similar manner to Example 1. DSC analysis showed the following features in the $2^{nd}$ heat: $T_g$ 147.5° C. (H-E/DCPD); $T_m$ 44.0° C., br (hydrogenated E/P/ENB); $T_g$ –40.3° C. (hydrogenated E/P/ENB).

Example 4

Preparation of Compression-Molded Samples of H-E/DCPD/E/P/ENB Rubber Blend Made by Tandem Solution-Blending/Hydrogenation The isolated blend material of Example 3 was compression-molded into specimens for room temperature and 0° C. Izod impact tests. Compression molding was chosen for sample preparation so as to most obviously demonstrate the success of the tandem solution-blending/hydrogenation technique in producing impact-modified materials (while compression molding typically produces less satisfactory specimens than injection-molding, injection-molding by necessity involves a pre-melt-mixing step). The blend material was compression-molded into rectangular impact bars of dimension 63×12×3 mm at 265° C. using a PHI company QL-433-6-M2 model hydraulic press equipped with separate heating and cooling platforms and a stainless steel mold. The upper and lower press plates were covered with Teflon™-coated aluminum foil, and halocarbon aerosol mold release agent (Miller-Stephenson MS-122DF) was sprayed onto the mold and press plates prior to pressing. The following multistage procedure was used after pre-heating the press plates to 265° C.: (1) 5 minutes at temperature with a slight (2 ton) overpressure followed by release; (2) 60 seconds at temperature and 10 tons followed by release; (3) 60 seconds at temperature and 20 tons followed by release; (4) 60 seconds at temperature and 30 tons followed by release; (5) 4 minutes at temperature and 30 tons followed by release; (6) 3 minutes at 7° C. (cooling platform) and 30 tons followed by release. A second set of bars was prepared at 250° C., using 8 minute periods for the initial (2 ton/250° C.) and, optionally, the final (30 ton/250° C.) press steps. All of the bars were opaque and light beige in color with some small voids appearing at the surface. The bars were individually weighed to provide additional relative characterization of quality, although no consistent relationships were observed between bar weight (greater weight=fewer voids) and impact strength.

Example 5

Large Scale In Situ Tandem Solution-Blending/Hydrogenation of E/DCPD Copolymer with Ethylene/1-Octene/4-Vinyl-1-Cyclohexene (E/O/VCH) Terpolymer Rubber A procedure similar to Example 3 was carried out in a linerless 2 L Parr reactor using 16.0 g of the E/DCPD copolymer described in Comparative Example C4 (91.25 mmol DCPD units) and 4.0 g of the E/O/VCH terpolymer described in Example 2 (8.572 mmol VCH units). The hydrogenation catalyst components used were 166 mg ($Ph_3P$)$_3$RhCl) (0.179 mmol; 558:1 total olefin:Rh) and 1.630 g $Ph_3P$ (6.21 mmol, 34.7:1 P:Rh). A crude yield of 18.74 g was obtained; re-precipitation from cyclohexane/acetone gave 17.89 g of the blend material as fluffy white granular pads/crumb (89%; theo. yield 20.208 g). $^1$H NMR analysis of the blend indicated only trace amounts of olefins and showed the presence of both polymer components in a similar manner to Example 2. DSC analysis showed the following features in the $2^{nd}$ heat: $T_g$ 145.1° C. (H-E/DCPD). A $T_g$ for the hydrogenated E/O/VCH terpolymer was not seen in the $2^{nd}$ heat; however, a very weak $T_g$ at –41.6° C. was seen in the $1^{st}$ heat and assigned to the hydrogenated E/O/VCH terpolymer.

Example 6

Preparation of Compression-Molded Samples of H-E/DCPD/E/O/VCH Rubber Blend Made by Tandem Solution-Blending/Hydrogenation The isolated blend material of Example 5 was compression-molded into rectangular impact bars of dimension 63×12×3 mm at 265° C. in a similar manner to that described in Example 4. The bars were opaque and light beige in color with some large internal voids (~1 mm diameter) visible. A second set of bars was prepared at 300° C.; in one instance, two bars were stacked and subjected to a second pressing procedure to obtain better fusion. These bars were slightly darker in color than the bars prepared at 265° C. The doubly-pressed bar was darker in color than the singly-pressed 300° C. bar and had fewer visible voids.

Comparative Example C5

Preparation of Compression-Molded Test Samples of Neat H-E/DCPD

The isolated H-E/DCPD material prepared in the repeat 20 g-scale hydrogenation procedure of Comparative Example C4 was compression-molded into rectangular impact bars of dimension 63×12×3 mm at 300° C. in a similar manner to that described in Examples 4 and 6. The resultant bars were dark brown in color, translucent, and brittle, and exhibited many internal voids. The pressing of these bars was markedly more difficult than the pressing of the in-situ-prepared blend bars in Examples 4 and 6, and required higher temperatures despite that fact that the same hydrogenated E/DCPD material (with an identical $T_g$) was used. In one instance, two bars were stacked and subjected to a second pressing procedure to obtain better fusion; this bar was darkest in color and exhibited the fewest voids.

Example 7

Property Comparison Between Compression-Molded Samples of Neat H-E/DCPD and Blends of H-E/DCPD and E/P/ENB or E/O/VCH Made by Solution-Blending/Tandem Hydrogenation The sample bars prepared in Examples 4, 6, and C5 were subjected to Notched Izod impact tests at room temperature and 0° C. using a TMI Izod Impact Tester (ASTM D256; 45° notch; 2.028 ft-lb pendulum). Bars used for 0° C. tests were pre-conditioned at 0° C. for 1 hour. All bars showed complete break upon impact. Results are summarized in Table 6. The test bars of neat H-E/DCPD were so brittle that data could not be generated (noted as 0 ft-lb/in in Table 6). As a secondary comparative, room temperature impact data for the neat H-E/DCPD test samples given in Comparative Example C3 (prepared by injection-molding and therefore of higher quality) are included in Table 6.

The data shown in Table 6 indicate that blends of H-E/DCPD copolymers with elastomers prepared by tandem solution-blending/hydrogenation demonstrate improved impact properties, even in an extreme case when no subsequent melt-mixing occurs. The room temperature and 0° C. Izod impact of the compression-molded samples of the H-E/DCPD/E/P/ENB and H-E/DCPD/E/O/VCH blends are superior to those for neat H-E/DCPD. In fact, the Izod impact values of these samples are superior to the room temperature impact value for injection-molded samples of neat H-E/DCPD. The E/P/ENB elastomer provided greater enhancement of impact strength at both room temperature and 0° C.

TABLE 6

Flexural modulus and notched Izod impact properties of compression-molded blends of H-E/DCPD and E/P/ENB or E/O/VCH made by solution-blending/tandem hydrogenation and comparative neat H-E/DCPD.

| Material | RT Izod (ft-lb/in)$^a$ | 0° C. Izod (ft-lb/in)$^a$ |
|---|---|---|
| Neat H-E/DCPD | 0 (1)$^b$ [0.243]$^c$ | 0 (2)$^b$ [RT 0.243]$^c$ |
| 70:30 H-E/DCPD/E/P/ENB | 0.900 ± 0.111 (2) 0.538 (1)$^e$ | 1.083 ± 0.152 (2)$^f$ |
| 70:30 H-E/DCPD/E/O/VCH | 0.337 ± 0.062 (2)$^g$ | 0.376 ± 0.101 (2)$^h$ |

$^a$RT = room temperature; numbers in parentheses = number of bars tested.
$^b$Unable to generate data because of extreme brittleness of samples.
$^c$Best room temperature result for neat H-E/DCPD samples prepared by injection molding (Comparative Example C3).
$^d$Bars made at 265° C.
$^e$Secondary data for bar made from material that had been pre-cold-pressed for 15 minutes at 30 tons into flat sheets; showed incomplete fusion.
$^f$Bars made at 250° C.; lower ft-lb/in bar showed minor incomplete fusion.
$^g$Bars made at 300° C.; lower ft-lb/in bar was made by re-pressing two bars together).
$^h$Bars made at 265° C.

An attempt has been made herein to disclose all embodiments and applications of the disclosed subject matter that could be reasonably foreseen. However, there may be unforeseeable, insubstantial modifications which remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description and examples.

What is claimed is:

1. A process for preparing polymeric compositions suitable for molding into structural polyolefin products, which process comprises:
   A) dissolving in a liquid reaction medium from 60 to 95 parts by weight of ethylene-dicyclopentadiene copolymer component having:
      i) a dicyclopentadiene-derived comonomer content of from 30 mole % to 55 mole % with at least 10 mol% of said dicyclopentadiene-derived comonomers having residual double bond moieties therein;
      ii) a weight average molecular weight, $M_w$, of from 100,000 to 800,000 g/mole; and
      iii) a glass transition temperature, $T_g$, of from 105° C. to 170° C.;
   B) co-dissolving with said ethylene-dicyclopentadiene copolymer component in said liquid reaction medium from 5 to 40 an elastomeric polymer component having a glass transition temperature, $T_g$, which ranges from −70° C. to −5° C.;
   C) subjecting said liquid reaction medium containing said ethylene-dicyclopentadiene copolymer component and said elastomeric polymer component to hydrogenation conditions in-situ, effective to completely hydrogenate the residual double bond moieties within said ethylene-dicyclopentadiene copolymer component and the elastomeric polymer component; and
   D) co-precipitating the resulting completely partially hydrogenated ethylene-dicyclopentadiene copolymer component and completely hydrogenated elastomeric polymer component from said liquid reaction medium as a co-precipitated polymeric composition With a precipitation-inducing agent which renders the polymer components insoluble in said liquid reaction medium.

2. The process according to claim 1, wherein said ethylene-dicyclopentadiene copolymer component further comprises a third comonomer based on norbornene.

3. The process according to claim 1, wherein from 0.1% to 95% of the residual double bonds of said dicyclopentadiene-derived comonomers have been functionalized before said ethylene-dicyclopentadiene copolymer component is completely hydrogenated.

4. The process according to claim 1, wherein said elastomeric polymer component is selected from the group consisting of:
   (A) flexible cycloolefinic random copolymers comprising an ethylene component, a cycloolefin component and an α-olefin component having 3 to 20 carbon atoms;
   (B) amorphous or low-crystalline flexible olefinic copolymers comprising at least two components selected from the group consisting of an ethylene component, a propylene component, and α-olefin components having from 4 to 20 carbon atoms;
   (C) flexible olefin/nonconjugated diene copolymers comprising a nonconjugated diene component and at least two components selected from the group consisting of an ethylene component, a propylene component and α-olefin components having 4 to 20 carbon atoms;
   (D) flexible diene/aromatic vinyl copolymers selected from the group consisting of random copolymers and block copolymers, each of said copolymers comprising a conjugated diene component, an aromatic vinyl hydrocarbon component, and the hydrogenation products of said diene/aromatic vinyl copolymers; and (E) flexible homopolymers selected from the group consisting of substantially atactic polypropylene, polybutadiene, polyisoprene, and the hydrogenated products of polybutadiene and polyisoprene.

5. The process according to claim 4, wherein said elastomeric polymer component comprises flexible cycloolefinic random copolymers comprising an ethylene component and a cycloolefin component selected from the group consisting of:

bicyclo[2,2,1]hept-2-ene;
5,10-dimethyltetracyclo[4,4,0,1$^{2.5}$,1$^{7.10}$]-3-dodecene;
hexacyclo[6,6,1,1$^{3.6}$,1$^{10.13}$,0$^{2.7}$,0$^{9.14}$]-4-heptadecene;
pentacyclo[6,5,1,1$^{3.6}$,0$^{2.7}$,0$^{9.13}$]-4-pentadecene;
pentacyclo[6,5,1,1$^{3.6}$,0$^{2.7}$,0$^{9.13}$]-4-hexadecene;
tricyclo[4,3,0,1$^{2.5}$]-3-decene;
substituted derivatives of said cycloolefins; and
  an α-olefin component is selected from the group consisting of propylene, 1-butene, 1-pentene, 1-hexene, 4-methyl-1-pentene, 1-octene, 1-dodecene, 1-tetradecene, 1-hexadecene, 1-octadecene, 1-eicosene and mixtures thereof.

6. The process according to claim 4, wherein said elastomeric polymer component comprises propylene homopolymer rubbers, ethylene-propylene copolymer rubbers, ethylene-α-olefin copolymer rubbers or propylene-α-olefin copolymer rubbers, wherein the α-olefin in said copolymer rubbers is selected from the group consisting of 1-butene, 1-pentene, 1-hexene, 4-methyl-1-pentene, 1-octene and 1-decene.

7. The process according to claim 6, wherein said homopolymer or copolymer rubbers are graft copolymerized or functionalized with an unsaturated carboxylic acid-based graft comonomer selected from the group consisting of acrylic acid, maleic acid, fumaric acid, tetrahydrophthalic acid, itaconic acid, citraconic acid, crotonic acid, isocrotonic acid, nadic acid (endo-cis-bicyclo[2,2,1]hept-5-ene-2,3-dicarboxylic acid), and their acid halide, amide, imide, anhydride, or ester derivatives.

8. The process according to claim 4, wherein said elastomeric polymer component comprises polybutadiene, polyisoprene, hydrogenated polybutadiene or polyisoprene, an ethylene-propylene-diene copolymer rubber, an ethylene-α-olefin-diene copolymer rubber or a propylene-α-olefin-diene copolymer rubber; wherein the α-olefin in said copolymer rubbers is selected from the group consisting of 1-butene, 1-pentene, 1-hexene, 4-methyl-1-pentene, 1-octene and 1-decene, and wherein the diene in said copolymer rubbers is selected from the group consisting of 1,4-hexadiene, 1,6-octadiene, 2-methyl-1,5-hexadiene, 6-methyl-1,5-heptadiene, 7-methyl-1,6-octadiene, 1,4-cyclohexadiene, dicyclopentadiene, 4-vinyl-1-cyclohexene, methyltetrahydroindenes, 5-vinyl-2-norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

9. The process according to claim 4, wherein said elastomeric polymer component comprises a flexible diene/aromatic vinyl polymer selected from the group consisting of (a) styrene-butadiene block copolymer rubbers, (b) styrene-butadiene-styrene block copolymer rubbers, (c) styrene-isoprene block copolymer rubbers, (d) styrene-isoprene-styrene block copolymer rubbers, (e) hydrogenated styrene-butadiene-styrene block copolymer rubbers, (f) hydrogenated styrene-isoprene-styrene block copolymer rubbers, and (g) graft-modified derivatives of said copolymer rubbers.

10. The process according to claim 1, wherein said reaction medium comprises an organic solvent.

11. The process according to claim 10, wherein said organic solvent is selected from the group consisting of benzene, toluene, xylenes, chlorobenzene, o-dichlorobenzene, 1,2,4-trichlorobenzene, cyclohexane, methylene chloride, 1,2-dichloroethane, tetrachloroethane, chloroform, carbon tetrachloride, tetrahydrofuran, and mixtures thereof.

12. The process according to claim 10, wherein said ethylene/dicyclopentadiene copolymer component and said elastomeric polymer component are dissolved in said reaction medium in a total concentration of both polymer components which ranges from 0.1 wt/vol % to 20.0 wt/vol %.

13. The process according to claim 1, wherein said precipitation-inducing agent comprises an organic liquid selected from the group consisting of methanol, isopropanol, acetone, hexane, and mixtures thereof.

14. The process according to claim 13, wherein said precipitation-inducing agent further comprises water and/or aqueous mineral acids or organic acids.

15. The process according to claim 1, wherein said hydrogenation conditions include the use of a hydrogenation catalyst, an H$_2$ pressure above the liquid reaction medium of from 200 psig (1379.0 kPa) to 1600 psig (11031.6 kPa), and a liquid reaction medium temperature of from 45° C. to 180° C.

16. The process according to claim 15, wherein said hydrogenation catalyst is selected from the group consisting of RuClH(CO)(PPh$_3$)$_3$, Co(acac)$_3$/Bu$_3$Al, nickel silica alumina, nickel/tungsten sulfides, Co-octanoate/Et$_3$Al, platinum/palladium, Pd/C, Rh(PPh$_3$)$_3$Cl and combinations thereof.

* * * * *